(12) United States Patent
Austrheim

(10) Patent No.: US 12,545,511 B2
(45) Date of Patent: Feb. 10, 2026

(54) ACCESS STATION FOR AN AUTOMATED STORAGE AND RETRIEVAL SYSTEM WITH CONTAINER TILT FUNCTIONALITY AND A METHOD FOR USING SAME

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 193 days.

(21) Appl. No.: 18/252,087

(22) PCT Filed: Nov. 10, 2021

(86) PCT No.: PCT/EP2021/081308
§ 371 (c)(1),
(2) Date: May 8, 2023

(87) PCT Pub. No.: WO2022/106287
PCT Pub. Date: May 27, 2022

(65) Prior Publication Data
US 2023/0391549 A1      Dec. 7, 2023

(30) Foreign Application Priority Data
Nov. 17, 2020  (NO) .................................. 20201252

(51) Int. Cl.
*B65G 1/04*     (2006.01)
*B65G 1/06*     (2006.01)

(52) U.S. Cl.
CPC ......... *B65G 1/0464* (2013.01); *B65G 1/0485* (2013.01); *B65G 1/065* (2013.01); *B65G 2201/0235* (2013.01)

(58) Field of Classification Search
CPC .... B65G 1/0464; B65G 1/0485; B65G 1/065; B65G 2201/0235
See application file for complete search history.

(56) References Cited

U.S. PATENT DOCUMENTS

| | | | |
|---|---|---|---|
| 5,642,976 A | 7/1997 | Konstant | |
| 11,873,014 B2 * | 1/2024 | Austrheim | ............. B65G 63/06 |

(Continued)

FOREIGN PATENT DOCUMENTS

| | | |
|---|---|---|
| CN | 107635896 A | 1/2018 |
| CN | 108290685 A | 7/2018 |

(Continued)

OTHER PUBLICATIONS

International Search Report issued in PCT/EP2021/081308 on Feb. 28, 2022 (6 pages).

(Continued)

*Primary Examiner* — Saul Rodriguez
*Assistant Examiner* — Ashley K Romano
(74) *Attorney, Agent, or Firm* — Baker Botts L.L.P.

(57) ABSTRACT

An access station, which is for presentation of a storage container from automated storage and retrieval system to a picker, has a receiving position for receiving a storage container, forward of the receiving position a picking position for picking products from the storage container, and a transfer zone connecting the receiving position and the picking position. The access station includes a ramp at least partly arranged below the transfer zone; a guiding frame arranged in a horizontal plane and extending between the picking position, the transfer zone and the receiving position; and an inner carriage for transporting a storage container. The inner carriage includes an inner carriage base movable along the guiding frame; a first storage container support pivotably connected to the inner carriage base; and (Continued)

a follower connected to and extending from the first storage container support for interaction with the ramp. The inner carriage has a receiving state in which the first storage container support is arranged substantially parallel to the horizontal plane, and a picking state in which the first storage container support is tilted relative to the horizontal plane with a predetermined tilting angle. A displacement device is configured to move the inner carriage between the receiving position and the picking position. The follower and the ramp are configured to interact to move the inner carriage into the picking state in response to a movement of the inner carriage from the receiving position to the picking position.

25 Claims, 16 Drawing Sheets

(56) References Cited

U.S. PATENT DOCUMENTS

| | | | |
|---|---|---|---|
| 11,905,058 B2* | 2/2024 | Lert, Jr. | G06Q 10/08 |
| 11,948,375 B2* | 4/2024 | Edwards | G06V 20/64 |
| 11,975,744 B2* | 5/2024 | Stuhaug | B65G 1/0492 |
| 12,030,720 B2* | 7/2024 | Yoshida | G05B 19/41835 |
| 12,045,773 B2* | 7/2024 | Chila | G07F 9/026 |
| 12,098,030 B2* | 9/2024 | Austrheim | B65G 1/1375 |
| 12,103,778 B2* | 10/2024 | Valinsky | B65G 1/0492 |
| 12,110,183 B2* | 10/2024 | Fosnight | B25J 9/1697 |
| 2005/0284731 A1* | 12/2005 | Hartness | B67C 3/04 |
| | | | 198/465.4 |
| 2005/0284735 A1* | 12/2005 | Hartness | B65G 17/42 |
| | | | 198/850 |
| 2006/0254221 A1* | 11/2006 | Guttinger | B65B 5/068 |
| | | | 53/542 |
| 2016/0355337 A1 | 12/2016 | Lert et al. | |
| 2018/0037410 A1 | 2/2018 | Dewitt | |
| 2018/0305123 A1 | 10/2018 | Lert, Jr. et al. | |
| 2019/0300286 A1 | 10/2019 | Hognaland et al. | |
| 2020/0245566 A1* | 8/2020 | Hung | A01G 9/042 |
| 2020/0346864 A1 | 11/2020 | Fjeldheim et al. | |
| 2021/0229916 A1 | 7/2021 | Austrheim | |
| 2023/0286762 A1* | 9/2023 | Bangalore Srinivas | |
| | | | B65G 1/0485 |
| 2023/0406637 A1* | 12/2023 | Chatain | B65G 1/0485 |
| 2024/0002149 A1* | 1/2024 | Austrheim | B65G 1/0485 |
| 2024/0034559 A1* | 2/2024 | Austrheim | B65G 1/065 |

FOREIGN PATENT DOCUMENTS

| | | |
|---|---|---|
| CN | 111511664 A | 8/2020 |
| DE | 102019204998 A1 | 10/2020 |
| JP | 2001-002239 A | 1/2001 |
| JP | 2019517446 A | 6/2019 |
| NO | 317366 B1 | 10/2004 |
| WO | 2013/033743 A1 | 3/2013 |
| WO | 2014/075937 A1 | 5/2014 |
| WO | 2014/090684 A1 | 6/2014 |
| WO | 2015/193278 A1 | 12/2015 |
| WO | 2016/120375 A1 | 8/2016 |
| WO | 2018/146304 A1 | 8/2018 |
| WO | 2019/238664 A1 | 12/2019 |
| WO | 2019238645 A1 | 12/2019 |
| WO | 2020/074717 A1 | 4/2020 |
| WO | 2020/094604 A1 | 5/2020 |
| WO | 2020/138648 A1 | 7/2020 |

OTHER PUBLICATIONS

Written Opinion of the International Searching Authority issued in PCT/EP2021/081308 on Feb. 28, 2022 (6 pages).
Norwegian Search Report issued in No. 20201252, mailed on Jun. 17, 2021 (2 pages).
Gao, Ying, Office Action in CN202180088908.0, mailed Jun. 5, 2025, 24 pages, The State Intellectual Property Office of the People's Republic of China, Beijing, China.
Takahashi, Takehiro, Office Action in JP2023528655, mailed Nov. 20, 2025, 10 pages, Japan Patent Office, Tokyo, Japan.
Gao Ying, Notification of the Second Office Action for Chinese Patent Application No. 202180088908.0 mailed Sep. 30, 2025, 15 pages (inclusive of translation), National Intellectual Property Administration, PRC, Beijing, China.

* cited by examiner

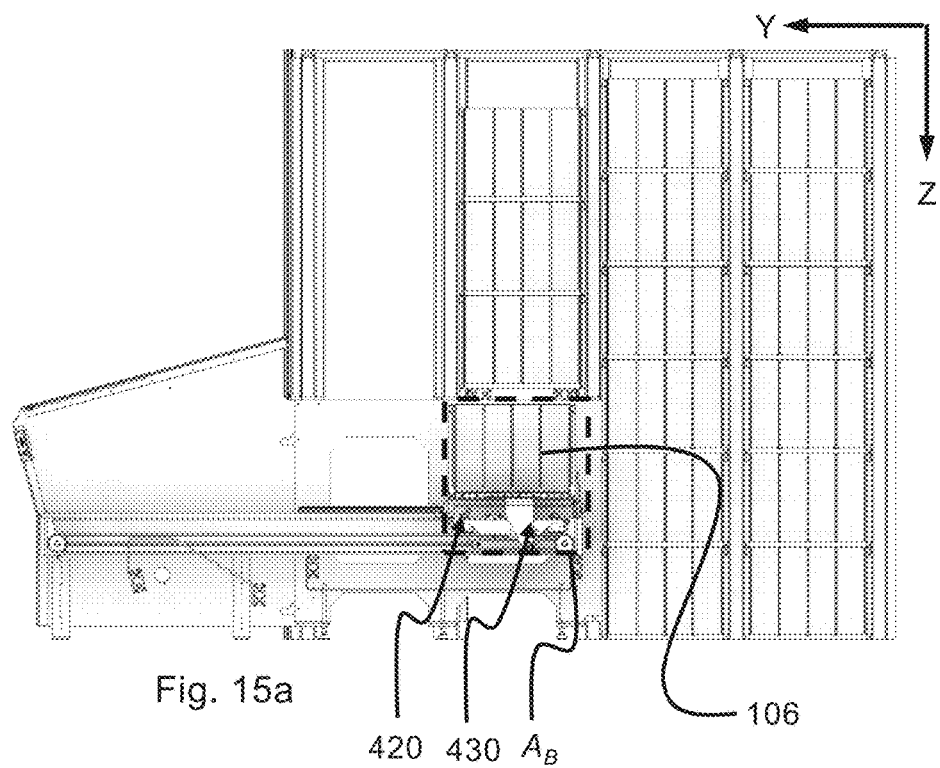
Fig. 15a    420  430  $A_B$    106
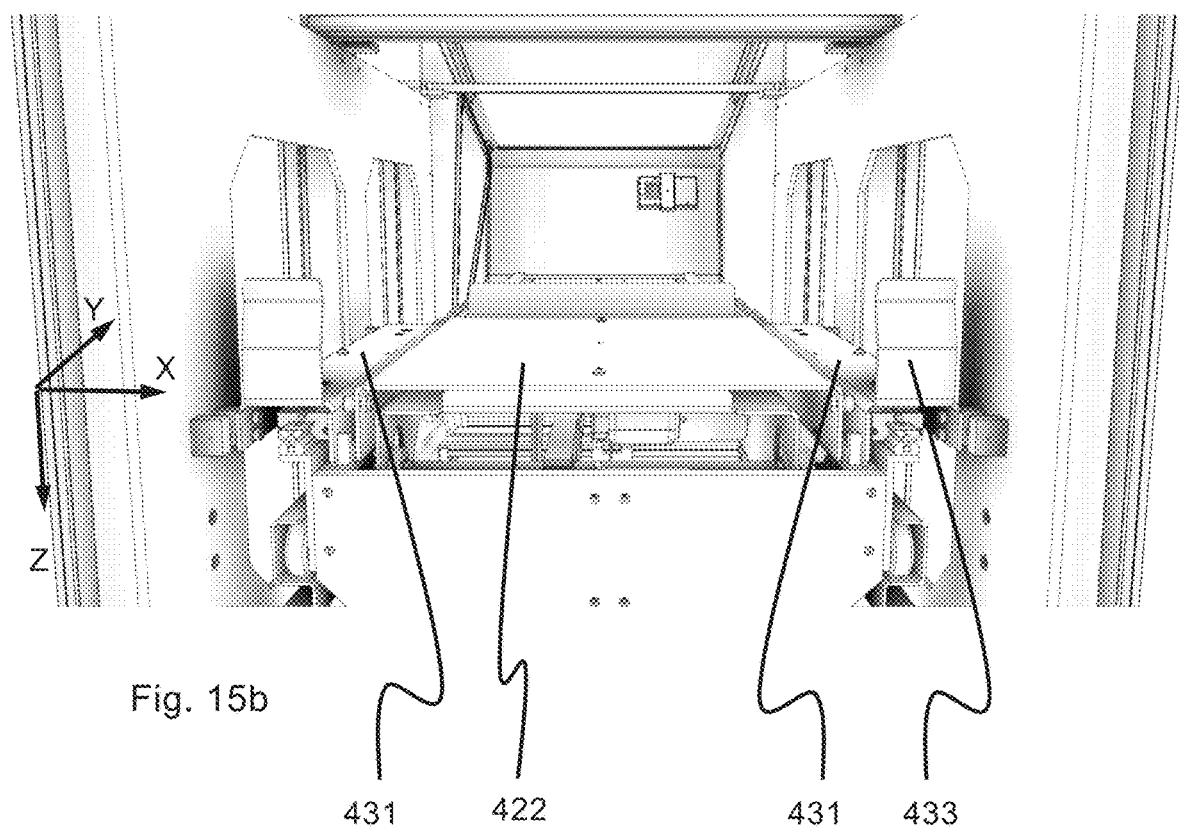
Fig. 15b    431  422    431  433

ACCESS STATION FOR AN AUTOMATED STORAGE AND RETRIEVAL SYSTEM WITH CONTAINER TILT FUNCTIONALITY AND A METHOD FOR USING SAME

FIELD OF THE INVENTION

The present invention relates to an automated storage and retrieval system for storage and retrieval of containers, in particular to an access station for presentation of a storage container from an automated storage and retrieval system to a picker.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 ... n and Y=1 ... n identifies the position of each storage column 105 in the horizontal plane $P_H$. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

FIG. 4 shows examples of product items 80 stored in a storage container 106. The storage container 106 illustrated in FIG. 4 has a height Hf, a width Wf and a length Lf. The storage container 106 has a horizontal cross section Af.

An access station for picking storage containers is disclosed in WO2020/074717. This access station comprises an entry conveyor and an exit conveyor. The access station therefore has a footprint exceeding the width/length of a storage column. There will therefore be some distance between the picking zone of two adjacent access stations.

The access station disclosed in WO2020/074717 also has many moving or rotating components, particularly associated with the conveyors, that are prone to wear and regularly require maintenance.

An objective of the present invention is therefore to provide a more compact access station where picking zones of two adjacent access stations can be arranged closer to each other.

A further objective of the present invention is to reduce the complexity of the access station, particularly regarding the number of moving components.

A further objective of the present invention is to provide an access station with tilt functionality providing an ergonomic picking position.

SUMMARY OF THE INVENTION

The present invention is set forth and characterized in the independent claims, while the dependent claims describe other characteristics of the invention.

The present invention relates to an access station for presentation of a storage container from automated storage and retrieval system to a picker, the access station having a receiving position for receiving a storage container, forward of the receiving position a picking position for picking products from the storage container, and a transfer zone connecting the receiving position and the picking position, wherein the access station comprising:
- a ramp at least partly arranged below the transfer zone;
- a guiding frame arranged in a horizontal plane P and extending between the picking position, the transfer zone and the receiving position;
- an inner carriage for transporting a storage container, wherein the inner carriage comprises:
  - an inner carriage base movable along the guiding frame;
  - a first storage container support pivotably connected to the inner carriage base; and
  - a follower connected to and extending from the first storage container support for interaction with the ramp;
  wherein the inner carriage has a receiving state in which the first storage container support is arranged substantially parallel to the horizontal plane $P_H$, and a picking state in which the first storage container support is tilted relative to the horizontal plane $P_H$ with a predetermined tilting angle $\alpha$; and
  - a displacement device configured to move the inner carriage between the receiving position and the picking position;
wherein the follower and the ramp are configured to interact to move the inner carriage into the picking state in response to a movement of the inner carriage from the receiving position to the picking position.

It is thus provided a simplified access system with few moving parts. Through the use of the carriages, the access station can be made with a width substantially equal to the width of the picking zone such that the distance between the picking zones of two adjacent access stations is reduced to a minimum.

The first storage container support may comprise a plate with a top surface for positioning of a storage container and an opposite under surface for arrangement of the follower. The follower may preferably extend longitudinally substantially orthogonal to the under surface of the first storage container support.

The follower may be configured to follow a surface of the ramp. As the vertical elevation of the ramp change, the follower may provide trust to the underside of the first container support, such that the first storage container is tilted relative to the horizontal plane $P_H$.

The ramp may be a bracket.

The first storage container support may comprise a retention lip for preventing a storage container from sliding off the storage container support when the inner carriage is in the picking state.

The automated storage and retrieval system may comprise a control system and the displacement device may be in communication with the control system.

The interaction between the follower and the ramp may be direct or indirect, e.g. via an intermediate component.

The displacement device may be configured to move the inner carriage in a reciprocating manner.

In one aspect, the inner carriage base may be a wheeled base.

Alternatively, the inner carriage base may comprise a sliding surface for movement along the guiding frame.

Alternatively, the guiding frame may comprise rollers or a conveyor for movement of the inner carriage base.

In one aspect, the displacement device may comprise a drive belt operated by an electric motor.

The drive belt may be arranged on the guiding frame and connected to the inner carriage base such that operation of the drive belt causes movement of the inner carriage base relative to the guiding frame.

The drive belt may be a conveyor belt or a chain.

The drive belt may be arranged on the inner carriage base and configured to drive a set of wheels provided on the inner carriage base.

Alternatively, the displacement device may be a linear actuator arranged on the guiding frame and connected to the inner carriage base.

Alternatively, the displacement device may be a rack and pinion device.

In one aspect, the ramp may have a first portion at least partly arranged below the transfer zone, wherein the first portion is inclined relative to the horizontal plane $P_H$.

The inclination angle of the first portion will affect the horizontal travel required of the inner carriage to enter the picking state, and thus also the opposite horizontal travel required of the inner carriage to enter the receiving state. The transfer zone may preferably have a greater horizontal extent than the horizontal travel required of the inner carriage to enter the picking state.

The first portion of the ramp may have a constant incline and thus follow a substantially straight line. The first portion of the ramp may have a gradual incline and thus follow a curve.

In one aspect, the ramp may comprise a second portion at least partly arranged below the picking position, wherein the second portion is inclined differently than the first portion relative to the horizontal plane $P_H$.

The second portion of the ramp may preferably be arranged adjacent the first portion of the ramp.

The second portion may preferably be less inclined than the first portion relative to the horizontal plane $P_H$.

The second portion may be substantially parallel to the horizontal plane $P_H$, i.e. not inclined relative to the horizontal plane $P_H$.

A second portion being substantially horizontal may allow horizontal travel of the inner carriage while maintaining the tilting angle $\alpha$ of the storage container support. The predetermined tilting angle $\alpha$ of the picking state of the inner carriage can thus be entered prior to the inner carriage reaching the picking position. The picker may then quicker recognise the items coming forward.

The second portion of the ramp may have a constant incline and thus follow a substantially straight line. The second portion of the ramp may have a gradual incline and thus follow a curve.

The second portion may be slightly curved to smooth the transition from one type of movement to another.

The predetermined tilting angle $\alpha$ may be adjusted according to the specific needs of a picker, and the height of the access station from the ground.

The tilting angle $\alpha$ may be adjusted with the length of the follower. The tilting angle $\alpha$ may also be adjusted with the vertical elevation of the ramp.

In one aspect, the pivotal connection between the inner carriage base and the first container support may have an axis of rotation $A_R$ substantially arranged in the horizontal plane $P_H$, and the follower is arranged at a distance from the axis of rotation $A_R$.

The distance between the axis of rotation and the follower will affect the horizontal travel required of the inner carriage to enter the picking state, and thus also the opposite horizontal travel required of the inner carriage to enter the receiving state. Shortening of the distance between the axis of rotation and the follower will reduce the horizontal travel required of the inner carriage to enter the picking state.

The axis of rotation $A_R$ may be arranged close to the front of the inner carriage base, i.e. offset from the centre of gravity of the first container support. This will cause the first container support to return to its receiving state under its own weight.

The axis of rotation $A_R$ may be arranged close to the centre of the inner carriage base, i.e. substantially in the centre of gravity of the first container support. This will cause a seesaw behaviour of the first container support. By moving the axis of rotation closer to the centre of the inner carriage base, less force may be required from the follower in tilting the first storage container support. The follower may be movably connected to the ramp, such that the first storage container support can be forced into the receiving state by the follower in response to a change in the vertical elevation of the ramp while moving the inner carriage in the horizontal direction.

In one aspect, the follower may comprise a distal end provided with a follower wheel.

Alternatively, the distal end may be provided with a roller, a ball or a sliding surface.

In one aspect, the follower may extend through the inner carriage base at least in the receiving state.

The follower may preferably also extend through the inner carriage base in the picking state.

In one aspect, the tilting angle α may be in the range from 2° to 60° relative to the horizontal plane $P_H$.

The tilting angle α may range from 2° to 60° relative to the horizontal plane $P_H$, more preferably from 3° to 50°, even more preferably from 4° to 45°, even more preferably from 5° to 40°, even more preferably from 6° to 35°, even more preferably from 7° to 30°, even more preferably from 8° to 25°, even more preferably from 9° to 20°, for example 15°. The ability to tilt the storage container allows inter alia a human operator to view and/or access the products within the storage container more easily. A preferred tilting angel range is 10° to 20°. Alternatively, this range may have a starting point of 1°, 2°, 3°, 4°, 5°, 6°, 7°, 8°, 9° or 15°. Alternatively, this range may have an end point of 15°, 20°, 25°, 30°, 35°, 40°, 45°, 50°, 60°.

In one aspect, the access station may have a buffer area for buffering of a storage container behind the receiving position, wherein the access station comprises:
an outer carriage for transporting a storage container, the outer carriage being movable along the guiding frame by means of the inner carriage, wherein the outer carriage comprises:
  a second storage container support; and
  a gap provided in the second storage container support for receiving the first container support of the inner carriage; and
  an attachment system for releasably connecting the inner carriage to the outer carriage;
wherein the inner carriage base comprises:
  an elevation mechanism for raising and lowering the first storage container support relative to the guiding frame;
wherein the displacement device is configured to move the inner carriage between the receiving position, the picking position, and the buffer area;
wherein the inner carriage has an elevated state in which the first storage container support is arranged at a higher elevation than the second storage container support, and a lowered state in which the first storage container support is arranged at a lower elevation than the second storage container support.

The attachment system may be configured to connect the inner carriage and the outer carriage either in the elevated state or in the lowered state of the inner carriage, and to disconnect the inner carriage and the outer carriage in the other of the elevated state or the lowered state of the inner carriage.

It is thus provided a simplified access system with few moving parts. The access system enables exchange of a storage container support between two storage container supports. The access station can be made with a width substantially equal to the width of the picking zone such that the distance between the picking zones of two adjacent access stations is reduced to a minimum.

The outer carriage is preferably not connected to the displacement device. The outer carriage may instead be displaceable by the inner carriage when the two are connected by means of the attachment system.

It is thus achieved a system in which the inner carriage can operate independently of the outer carriage without the two requiring separate displacement devices.

When connected, the attachment system may allow horizontal relative movement between the inner carriage and the outer carriage within a given range. Within this movement range, the inner carriage may move while the outer carriage is stationary.

When connected, a horizontal footprint of the inner carriage and a horizontal footprint of the outer carriage will typically have at least a partial overlap.

When not connected, the inner carriage and the outer carriage may be positioned at a horizontal distance from each other.

The attachment system may be arranged such that the inner carriage and the outer carriage can carry one storage container each while being connected.

The gap may divide the second storage container support into two separate opposite portions. Alternatively, they may be connected e.g. by a rod in a manner allowing receipt of the inner carriage.

The outer carriage has a horizontal width orthogonal to its horizontal direction of travel. The inner carriage has a horizontal width orthogonal to its horizontal direction of travel. The horizontal width of the outer carriage is preferably greater than the horizontal width of the inner carriage.

The displacement device may be configured to move the inner carriage in a reciprocating manner to and from the picking position.

In one aspect, the attachment system may comprise:
  a first coupling part arranged on the inner carriage; and
  a set of second coupling parts arranged on the outer carriage at a horizontal distance defining a horizontal movement range between the inner carriage and the outer carriage;
wherein the first coupling part and the set of second coupling parts are engageable when the inner carriage is in the lowered state;
wherein the first coupling part and the second coupling parts are not engageable when the inner carriage is in the elevated state.

The inner carriage may thus be connected to and disconnected from the outer carriage by means of the elevation mechanism operating the inner carriage between the elevated state and the lowered state. The preferred connection is achieved when the first coupling part is located between the set of second coupling parts.

The first and second coupling parts may be a peg and hook type mechanism, obstructing brackets, a brake, a clutch, or a catch mechanism including blocking, frictional and magnetic engagement. The engagement may be directly or indirectly activated by means of the elevation mechanism, i.e. the movement or rotation of one of the components of the elevation mechanism, e.g. the linkage. Alternatively, the first and second coupling parts may engage in the horizontal direction, e.g. by means of locking bolts.

In one aspect, the first coupling part may be arranged at a rear end of the inner carriage, and the second coupling parts are arranged at opposite ends of the outer carriage. I.e. the second coupling parts being spaced apart.

The inner carriage may then move horizontally relative to the outer carriage until the first coupling part engages one of the second coupling parts. The first storage container support and the second storage container support may then substantially be vertically aligned. Further horizontal movement of the inner carriage relative to the outer carriage may cause the inner carriage and the outer carriage to hook up together. The outer carriage may then be towed by the inner carriage, i.e. horizontal travel of the inner carriage may cause an equal horizontal travel of the outer carriage.

The inner carriage may then move in a second horizontal direction, opposite the first horizontal direction, until the first coupling part engages another one of the second coupling parts. The first storage container support and the second storage container support may then substantially have no vertical overlap. One storage container may then be placed on the first storage container support while another storage container is placed on the second storage container support. Further movement of the inner carriage in the second horizontal direction will cause the outer carriage to follow.

A forward end of the inner carriage being on the picking position side of the inner carriage, and a rear end of the inner carriage being on the buffer area side of the inner carriage, when the inner carriage is located in the receiving position.

In one aspect, the outer carriage may comprise a vertically extending portion for hooking a storage container positioned on the first storage container support and moving in the horizontal direction towards the buffer area.

When a storage container has reached the vertical plate, further horizontal movement of the storage container, i.e. the inner carriage, will cause the outer carriage to follow. The vertical plate is preferably arranged in a distal end of the outer carriage, allowing substantially vertical alignment of the first storage container support and the second storage container support when a storage container is placed on the first storage container support.

In one aspect, the guiding frame may comprise a first guide path and a second guide path parallel to the first guide path;
wherein the inner carriage is movable along the first guide path and the outer carriage is movable along the second guide path.

In one aspect, the access station may further comprise:
a position holding device for holding the outer carriage in a predetermined position.

The position holding device may be magnets arranged on the outer carriage and the guiding frame. A position holding device without moving components can thus be achieved. The strength of the magnets can be selected to achieve the desired resistance against a change in position.

The predetermined position may typically be the receiving position and/or the buffer area of the access station.

The position holding device may be particularly useful when moving the inner carriage while keeping the outer carriage stationary.

In one aspect, the elevation mechanism may comprise:
a motor arranged in the inner carriage base for providing rotational drive;
a drive crank coupled to the motor to transmit rotational drive from the motor;
a coupler link pivotally coupled to the drive crank;
a drive coupling link pivotally coupled to the coupler link, the coupler link coupling rotational drive from the drive crank to the drive coupling link; and
a set of displacement links pivotally coupled to opposite ends of the drive coupling link;
wherein the displacement links are pivotably connected to the inner carriage base, such that the drive coupling link, displacement links and inner carriage base act as a parallel-linkage mechanism that raises and lowers the first storage container support.

The inner carriage may be supported by the drive coupling link. The drive coupling link may then interface the guiding frame. The parallel-linkage mechanism may thus raise and lower the first storage container support, together with the inner carriage base, relative to the guiding frame.

The inner carriage may comprise wheels for interfacing the guiding frame, i.e. for supporting the inner carriage. These wheels may be mounted on the displacement link. The wheels may alternatively be arranged on a shaft connected to or supported by the displacement link. These wheels can thus be raised and lowered relative to the first storage container support, by means of the parallel-linkage mechanism, such that the first storage container can be raised and lowered relative to the first storage container support.

Alternatively, the elevation mechanism may be configured to raise and lower the first storage container support relative to the inner carriage base.

The coupler link may have a recess.

The coupler link, drive crank, drive coupling link, displacement link and first storage container support are coupled by pivots.

In a lowered state of the inner carriage, the coupler link straddles a pivot point of the drive crank, such that the pivots of the coupler link are positioned on opposite sides of the drive crank's pivot point.

The drive coupling link may be substantially parallel to the horizontal plane $P_H$ in both the lowered state and the elevated state of the inner carriage.

The drive crank may be arranged to move through an angle of approximately 180 degrees between the lowered state and the elevated state of the inner carriage.

The drive crank's movement may be limited by stops.

The present invention also relates to an inner carriage for an access station as described herein,
wherein the inner carriage may comprise:
an inner carriage base configured for movement along a guiding frame;
a first storage container support pivotably connected to the inner carriage base; and
a follower connected to and protruding from the first storage container support configured for at least indirectly interaction with a ramp;
wherein the inner carriage has a receiving state in which the first storage container support is arranged substantially parallel to a horizontal plane $P_H$, and a picking state in which the first storage container support is tilted relative to the horizontal plane $P_H$ with a predetermined tilting angle $\alpha$; and wherein gravity biases the inner carriage towards the receiving state, and the interaction between the follower and the ramp urges the first storage container support of the inner carriage towards the picking state.

In one aspect, the inner carriage base of the inner carriage may comprise:
an elevation mechanism for raising and lowering the first storage container support.

The present invention also relates to an automated storage and retrieval system,
wherein the automated storage and retrieval system may comprise:
an access station as described herein;
a rail system comprising a first set of parallel rails arranged in a horizontal plane $P_H$ and extending in a first direction X and a second set of parallel rails arranged in the horizontal plane $P_H$ and extending in a second direction Y which is orthogonal to the first direction X, which first and second sets of rails form a grid pattern in the horizontal plane $P_H$ comprising a plurality of adjacent grid cells, each comprising a grid opening defined by a pair of neighbouring rails of the first set of rails and a pair of neighbouring rails of the second set of rails;
a plurality of stacks of storage containers arranged in storage columns located beneath a storage section of the rail system, wherein each storage column is located vertically below a grid opening;
at least one port column located beneath a delivery section of the rail system and vertically aligned with the receiving position of the access station, the at least one port column being void of storage containers; and
a container handling vehicle comprising a lifting mechanism for lifting storage containers stacked in the stacks above the storage section and drive means configured to drive the vehicle along the rail system in at least one of the first direction X and the second direction Y.

In the receiving position, the inner carriage may receive a storage container from a container handling vehicle through the port column. Storage containers may be supplied to the receiving position vertically through the port column, e.g. by means of a container handling vehicle operating on the rail system. Alternatively, storage containers may be supplied to the receiving position from the side, e.g. by means of a container handling vehicle operating on the same level as the access station.

The present invention also relates to a method for presenting a storage container to a picker using an automated storage and retrieval system as described herein,
wherein the method may comprise the steps of:
moving the first storage container support of the inner carriage into the receiving state in the receiving position;
placing a target storage container on the inner carriage;
moving the inner carriage along the guiding frame by means of the displacement device to move the inner carriage into the picking state in the picking position.

The present invention also relates to a method for transferring a storage container using an automated storage and retrieval system as described herein,
wherein the method comprises the steps of:
placing a first storage container on the first storage container support;
if the inner carriage is in the lowered state, raising the first storage container support to move the inner carriage into the elevated state;

moving the inner carriage along the guiding frame until the first storage container support is substantially received by a gap in the second storage container support; and
lowering the first storage container support to move the inner carriage into the lowered state, thereby placing the storage container on the second storage container support.

It is thus achieved a method for transferring a storage container from the first storage container support to the second storage container support.

In one aspect, the method may further comprise the steps of:
moving the inner carriage to the receiving position;
placing a second storage container on the first storage container support;
attaching the outer carriage to the inner carriage using the attachment system in case the outer carriage is not already attached to the inner carriage; and
moving the inner carriage and the outer carriage to locate the outer carriage in the receiving position.

The inner carriage may thus receive a second storage container before the first storage container has been retrieved. The first storage container is positioned for retrieval and can be retrieved immediately or at a later stage.

In one aspect, the method may further comprise the steps of:
raising the first storage container support to move the inner carriage into the elevated state, thereby disconnecting the attachment system and separating the inner carriage from the outer carriage;
moving the inner carriage to the picking position.

The inner carriage is thus disconnected from the outer carriage and may move the second storage container to the picking position while the outer carriage remains in the receiving position. The inner carriage may thus continue its operation before the first storage container has been retrieved. In this way time can be saved.

In one aspect, the method may further comprise the steps of:
retrieving the first storage container from the second storage container support through the port column.

The retrieval of the first storage container may be performed before or after the disconnection of the inner carriage and the outer carriage.

BRIEF DESCRIPTION OF THE DRAWINGS

Following drawings are appended to facilitate the understanding of the invention. The drawings show embodiments of the invention, which will now be described by way of example only, where:

FIG. 13b is a rear view of the access station of FIG. 13a;

FIG. 15a is a vertical cross-section of the access station with both the inner carriage and the outer carriage in the buffer area, the inner carriage is in the elevated state and carrying a storage container;

FIG. 15b is a rear view of the access station with both the inner carriage and the outer carriage in the buffer area, the inner carriage is in the elevated state;

DETAILED DESCRIPTION OF THE INVENTION

Figure 1:
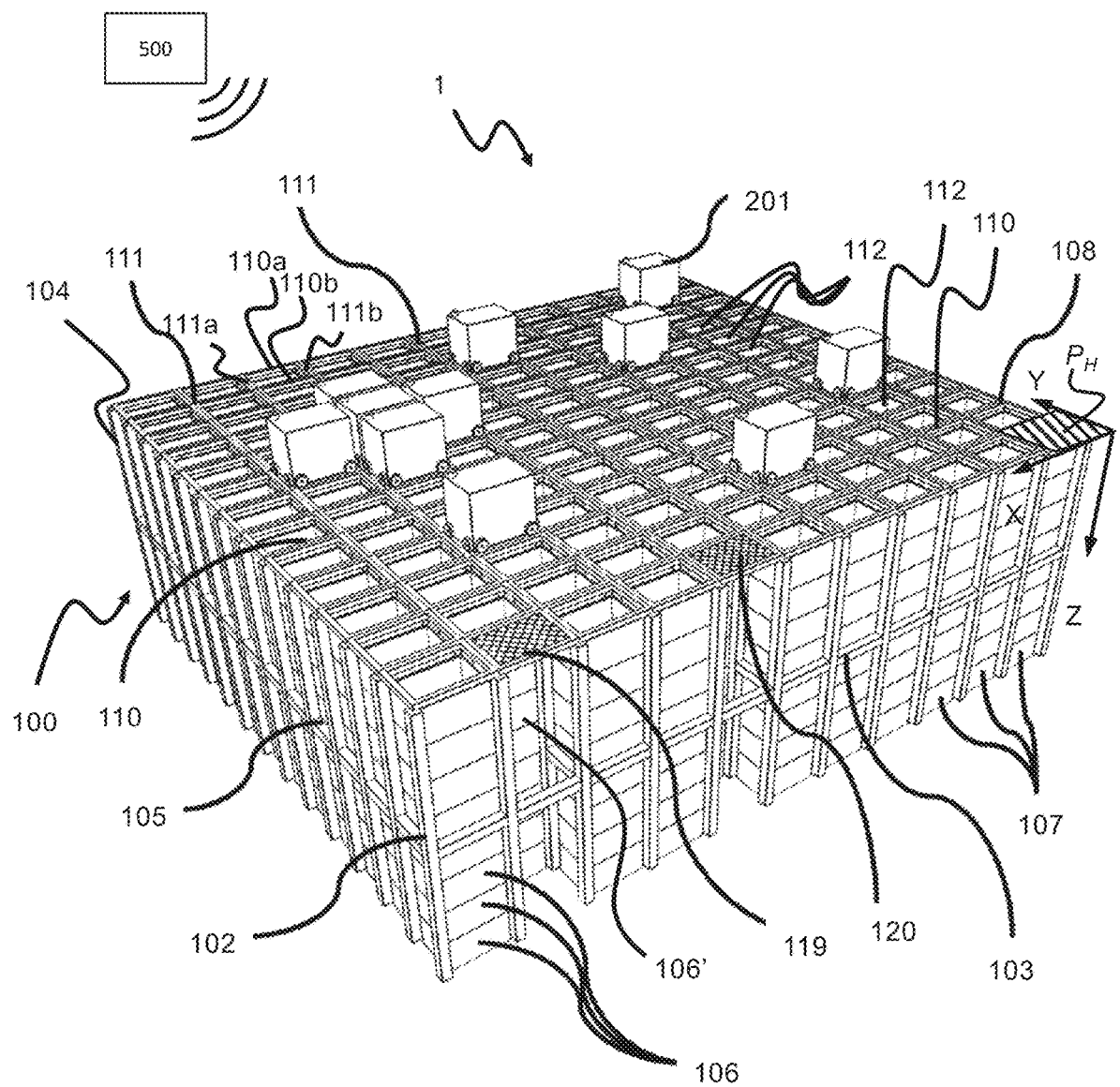
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
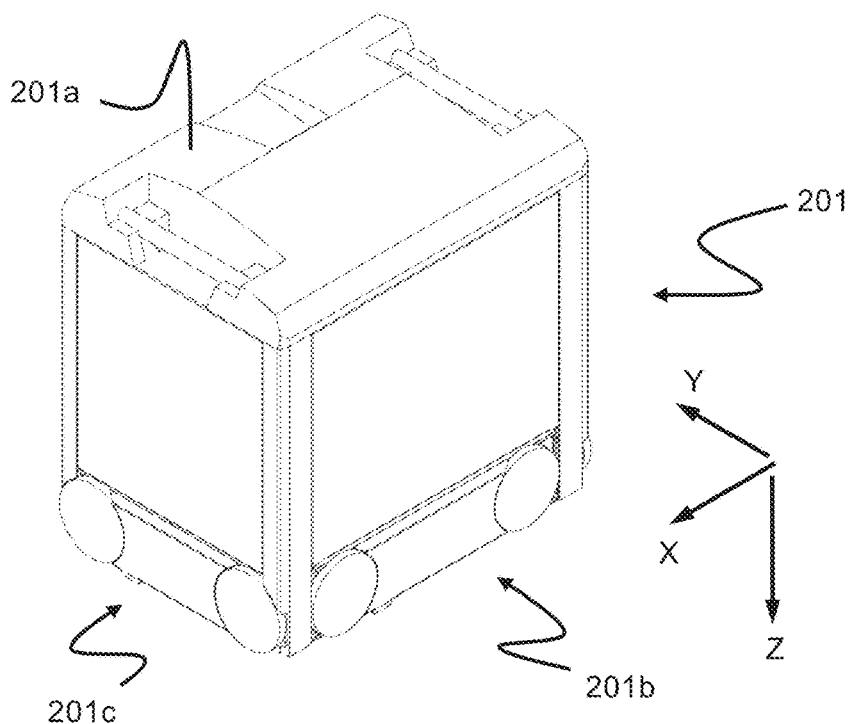
FIG. 2 is a perspective view of a prior art container handling vehicle having a centrally arranged cavity for carrying storage containers therein.
Figure 3:
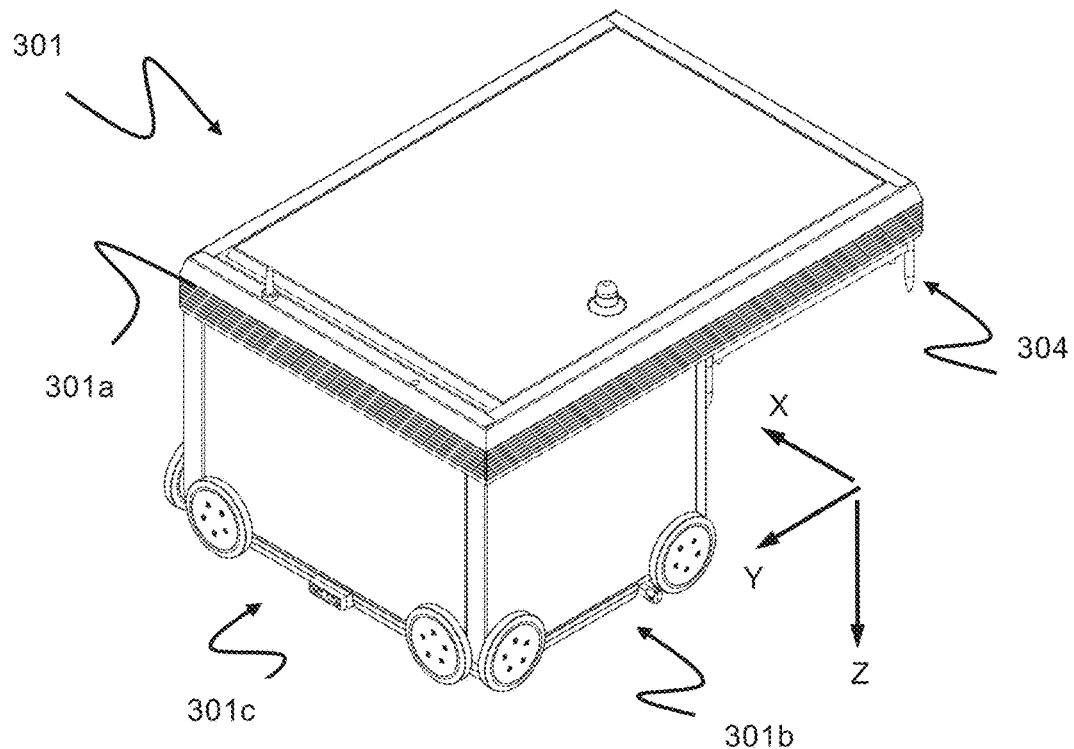
FIG. 3 is a perspective view of a prior art container handling vehicle having a cantilever for carrying storage containers underneath.
Figure 4:
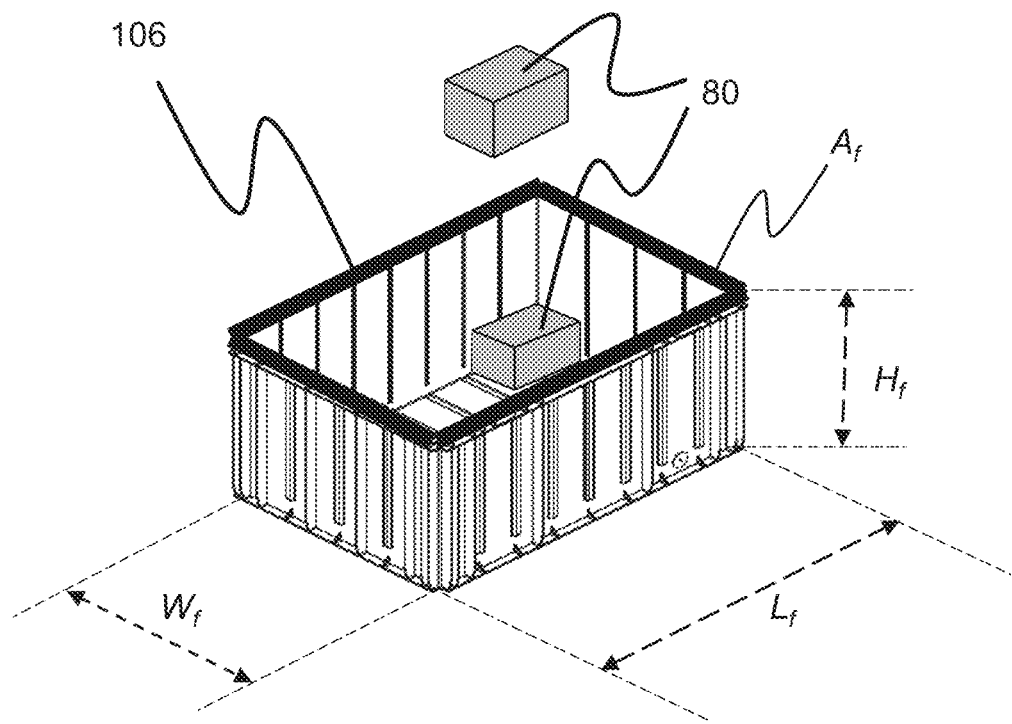
FIG. 4 is a perspective view of a storage container and product items stored in the storage container.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 5:
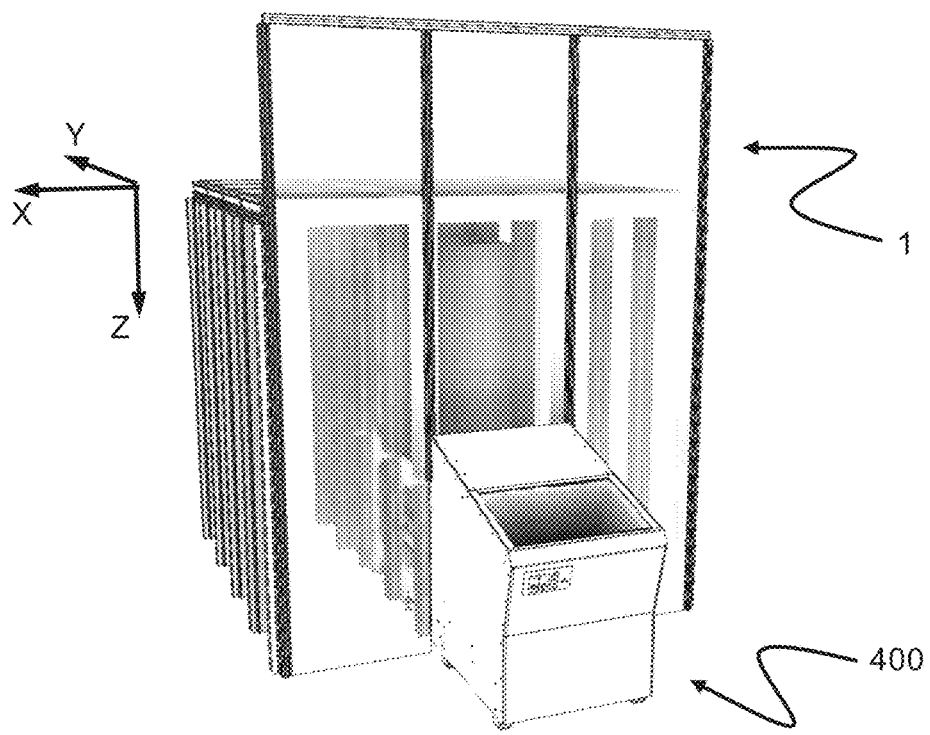
FIG. 5 is a perspective view of an access station for presentation of a storage container from an automated storage and retrieval system to a picker.

FIG. 5 shows a perspective view of an access station 400. When in connection with an automated storage and retrieval system 1, the access station 400 may be used for presentation of a storage container 106 from the automated storage and retrieval system 1 to a picker. Different kinds of container handling vehicles 201, 301 may be used to deliver storage containers 106 from a storage location within the automated storage and retrieval system 1 to the access station 400. The access station 400 can then move the storage container 106 to a position in which the picker can be granted a limited access to the storage container 106 being presented, preferably only to an open side of the storage container 106 being presented. Access may e.g. be granted by an automatically operated hatch. After a product 80 has been picked by the picker, the presented storage container 106 can be returned for storage in the automated storage and retrieval system 1. The access station 400 may then move the storage container to a position from which it can be retrieved by some type of container handling vehicle 201, 301.

The access station 400 may have a portion extending horizontally outside the framework structure 100 of the connected automated storage and retrieval system 1.

Figure 6:
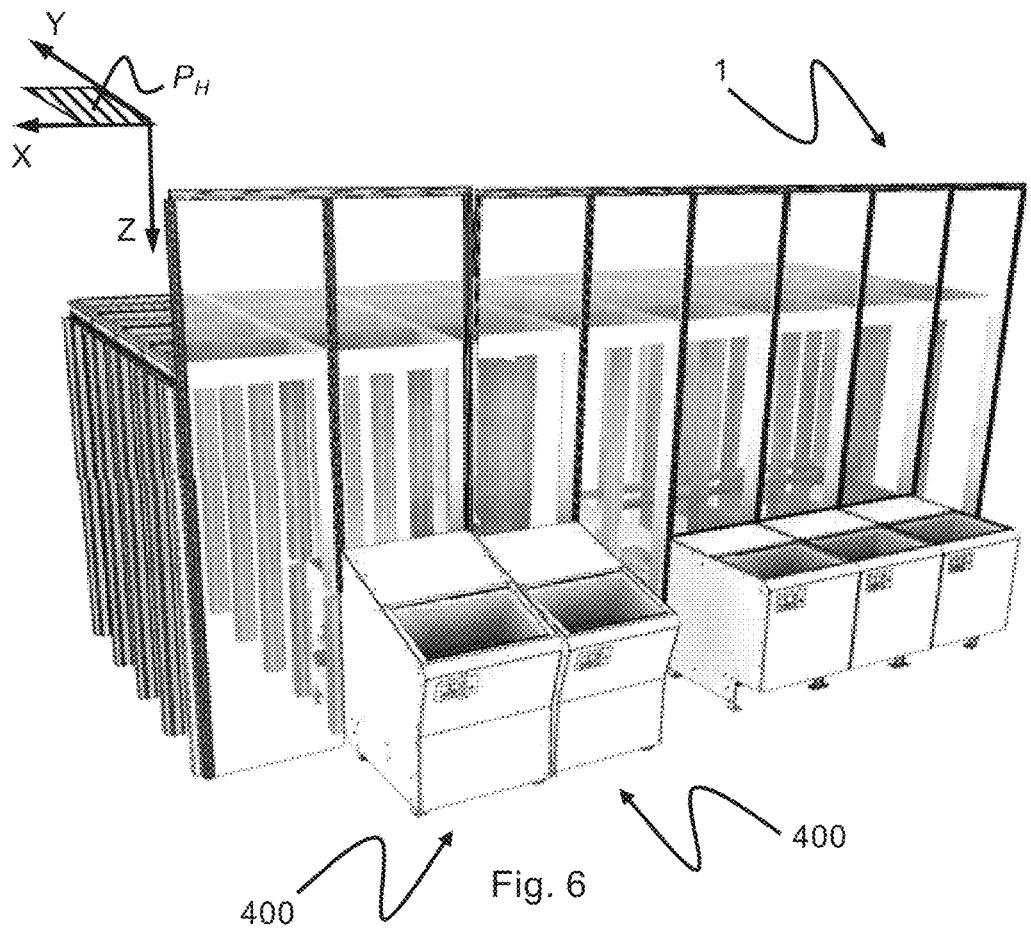
FIG. 6 is a perspective view of several access stations, for presentation of a storage container from an automated storage and retrieval system to a picker, arranged side-by-side.

FIG. 6 is a perspective view of several access stations 400. As illustrated, the access station 400 may have a substantially horizontal interface towards the picker. Alternatively, the access station 400 may have an interface towards the picker that is tilted relative to the horizontal plane $P_H$. The tilted interface will allow a more ergonomic working position for a human picker and a better overview of the contents of the storage container 106.

The access station 400 may be produced with a preferred height and be provided with adjustable feet. The height of the access station 400 can preferably be adapted to the average height of a human picker. The height of the access station 400 may preferably also be adapted to the height $H_f$ of the storage containers 106.

The access station 400 may be produced with a preferred width. The width of the access station 400 can preferably be adapted to the length $L_f$ or width $W_f$ of the storage containers 106, depending on the orientation of the storage container 106 in the access station 400. The access station 400 may be provided with a smaller width if the storage container 106 is oriented with its shortest side in the width direction of the access station 400.

By adapting the width of the access station 400 to the width of one storage column 105, two or more access stations 400 can be arranged side-by-side in a space efficient manner, i.e. not spaced apart. Such arrangement of the access stations 400 may enable the human picker to be more efficient due to shorter distances between the access stations 400.

Figure 7:
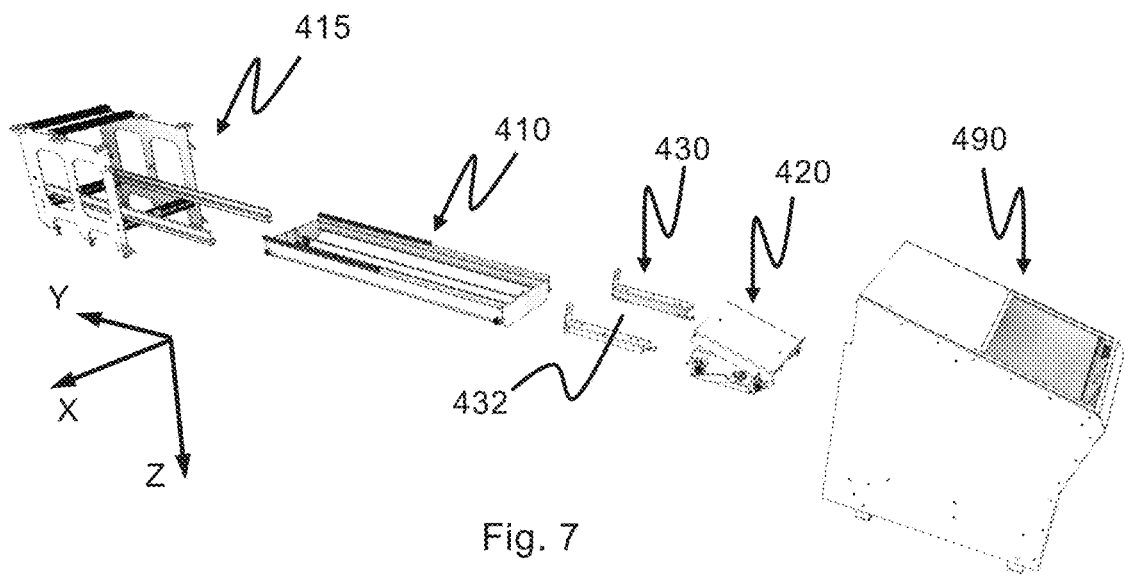
FIG. 7 is an exploded view of the access station comprising a guiding frame, an outer carriage, an inner carriage, and an access cabinet.

FIG. 7 is an exploded view of the access station 400. The access station 400 may comprise a guiding frame 410, an outer carriage 430, an inner carriage 420, and an access cabinet 490. The access station 400 may be configured for connection to a grid frame 415. The grid frame 415 may be further configured for connection to the automated storage and retrieval system 1.

Figure 8:
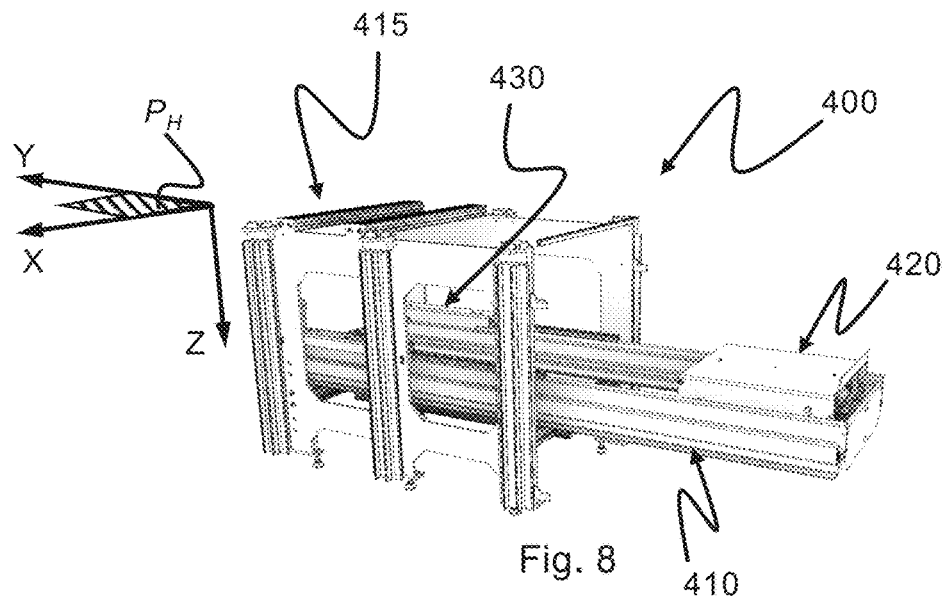
FIG. 8 is a perspective view of the access station partly assembled and connected to a grid frame.

FIG. 8 is a perspective view of the access station 400 partly assembled, i.e. without the access cabinet 490, and connected to the grid frame 490. The inner carriage 430 and the outer carriage 420 may be movably arranged on the guide frame 410. The guide frame 410 may be supported by the grid frame 415. When supported by the grid frame 415, the guide frame 410 will typically be arranged in the horizontal plane $P_H$.

The guiding frame 410 may be arranged with a portion inside the grid frame 415 and another portion outside the grid frame 415. The portion of the guiding frame 410 being outside the grid frame 415 will typically be received by the access cabinet 490, as illustrated in FIG. 9.

Figure 9:
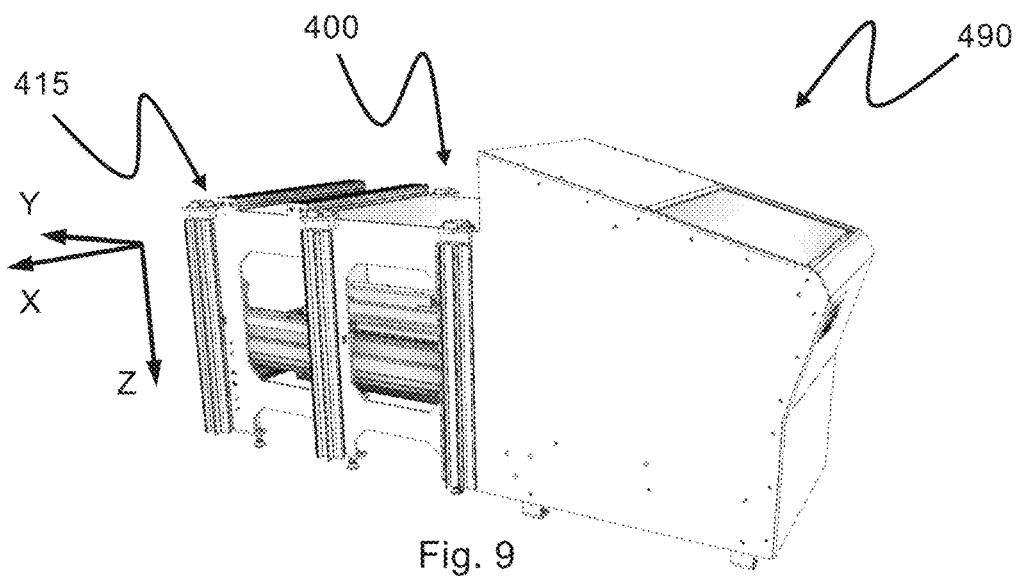
FIG. 9 is a perspective view of the assembled access station with an access station and connected to a grid frame.

FIG. 9 is a perspective view of the access station 400 of FIG. 7 in an assembled state and connected to the grid frame 415. The access cabinet 490 may be connected to the grid frame 415.

Figure 10:
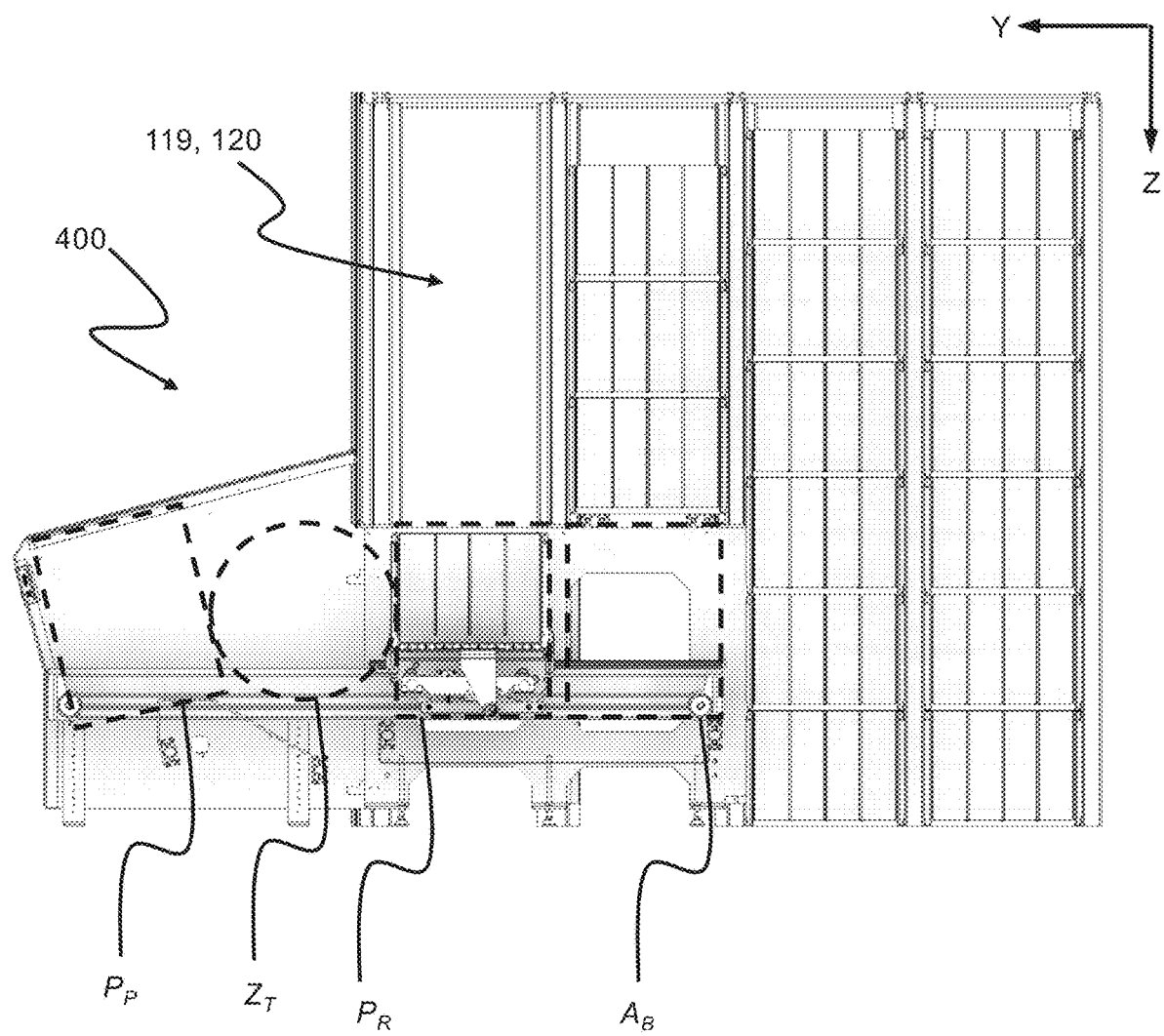
FIG. 10 is a vertical cross-section of the access station indicating a picking position, a transfer zone, a receiving position and a buffering area of the access station.

FIG. 10 is a vertical cross-section of the access station 400. The inner carriage 420 may be moved along the grid frame 415 between a receiving position $P_R$ and a picking position $P_P$.

The receiving position $P_R$ may be arranged such that the inner carriage 420 can receive storage containers 106 from above, typically from a storage container handling vehicle 201, 301. Alternatively, or additionally, the receiving position $P_R$ may be arranged such that the inner carriage 420 can receive storage containers 106 from the side, typically from a conveyor. The receiving position $P_R$ may be arranged inside the framework structure 100, e.g. below a port column 119, 120, such that storage containers 106 can be received through the port column 119, 120.

The picking position $P_P$ may be arranged such that a picker (human or robotic) can access a product item 80 placed in a storage container 106 supported by the inner carriage 420 when the inner carriage 420 is in the picking position $P_P$. The picking position $P_P$ will typically be arranged outside the framework structure 100. When arranged outside the framework structure 100, the picking position $P_P$ will typically be arranged inside the access cabinet 490.

The picking position $P_P$ and the receiving position $P_R$ may be directly connected or indirectly connected via a transfer zone $Z_T$. The inner carriage 420 may thus move through the transfer zone $Z_T$ when moving between the picking position $P_P$ and the receiving position $P_R$. The transfer zone $Z_T$ is preferably configured such that the inner carriage 420 can move therethrough while supporting a storage container 106.

The inner carriage 420 may be moved along the grid frame 415 into a buffering area $A_B$. The buffering area $A_B$ and the picking position $P_P$ may typically be arranged on opposite sides of the receiving position $P_R$. When the receiving position $P_R$ is arranged inside the framework structure 100, the buffering area $A_B$ will typically also be arranged inside the framework structure 100.

The buffering area $A_B$ is preferably configured such that the inner carriage 420 can move therethrough while supporting a storage container 106. The buffering area $A_B$ may be configured to receive one or several storage containers 106. The buffering area $A_B$ may be configured such that storage containers 106 can be stored and stacked above it.

In FIG. 10, the inner carriage 420 is supporting a storage container 106 in the receiving position $P_R$. The inner carriage 420 and the outer carriage 430 may both be in the receiving position $P_R$ at the same time.

The outer carriage 430 may be moved along the grid frame 415 between the buffering area $A_B$ and the receiving position $P_R$. The inner carriage 420 and the outer carriage 430 may both be in the buffering area $A_B$ at the same time.

Figure 11:
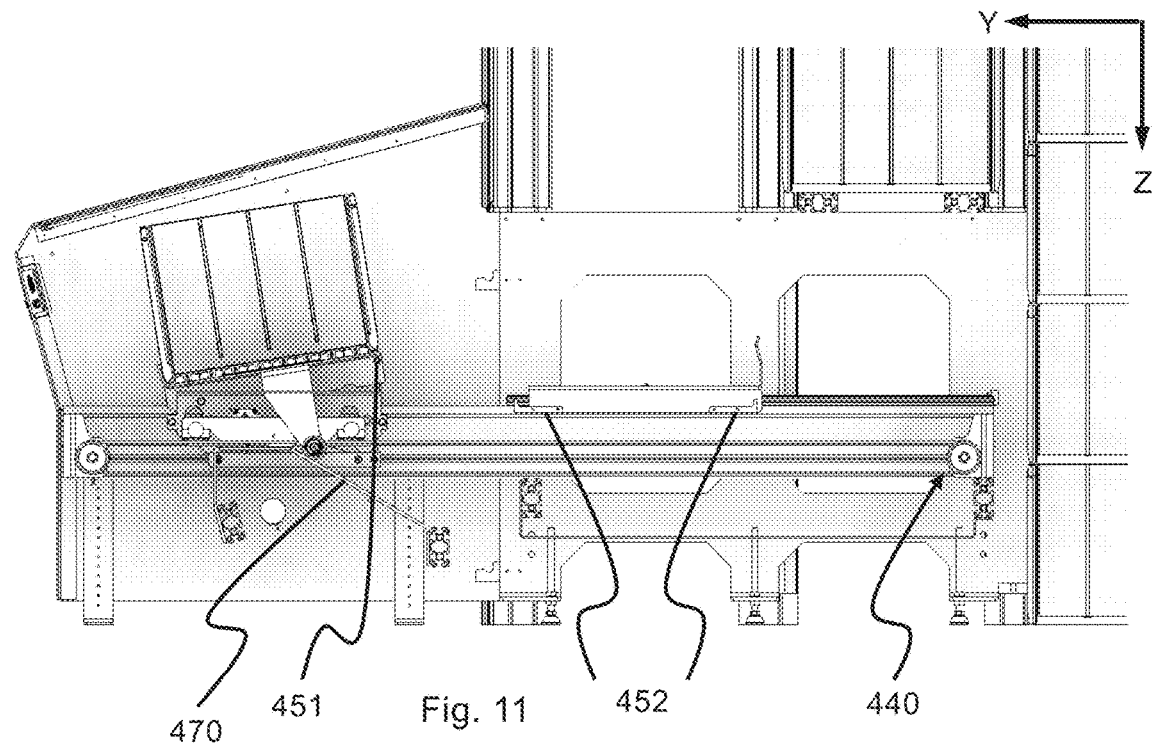
FIG. 11 is a vertical cross-section of the access station with the outer carriage in the receiving position and the inner carriage in the transfer zone.
Figure 12:
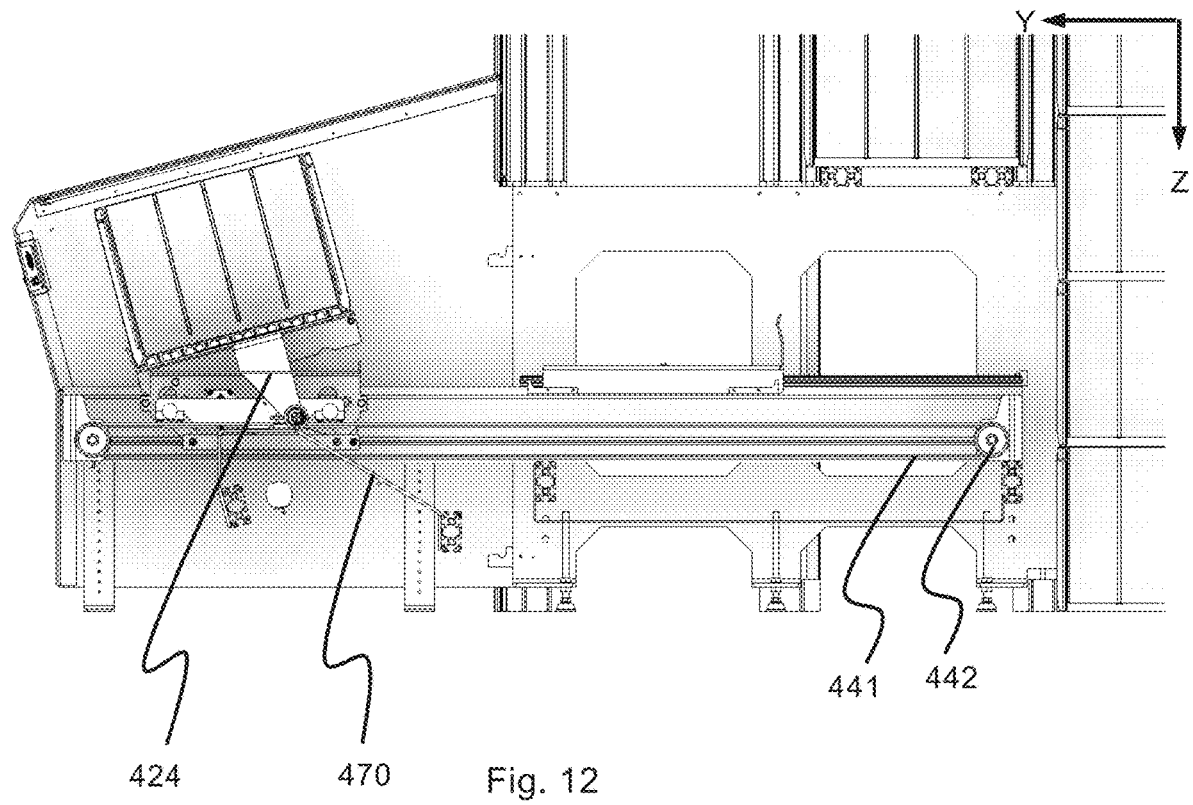
FIG. 12 is a vertical cross-section of the access station wherein the inner carriage has a different tilting angle as compared to FIG. 11.

FIG. 11 and FIG. 12 are vertical cross-sections of the access station 400. The outer carriage 430 is in the receiving position $P_R$ while the inner carriage 420 is in the transfer zone $Z_T$ and supporting a storage container 106.

The access station 400 may comprise a displacement device 440 configured to move the inner carriage 420 between the receiving position $P_R$ and the picking position $P_P$. The displacement device 440 may also be configured to move the inner carriage 420 through the transfer zone $Z_T$. The displacement device 440 may also be configured to move the inner carriage 420 into the buffering area $A_B$.

The inner carriage 420 may comprise an inner carriage base 421, movable along the guiding frame 410; a first storage container support 422, pivotably connected to the inner carriage base 421; and a follower 424, connected to and extending from the first storage container support 422.

One example of a displacement device 440 is illustrated to comprise a drive belt 441 that is operated by an electric motor 442. The electric motor 442 may be configured to communicate with the control system 500. The inner carriage 420 may comprise a drive belt bracket 426 as illustrated in FIG. 14c. By attaching the drive belt 441 to the drive belt bracket 426, the inner carriage 420 can be moved by the displacement device 440.

When the displacement device 440 comprises a drive belt 441, the inner carriage base 421 may e.g. be a wheeled base configured to move along a first path 411 of the guiding frame 410.

The inner carriage 420 may have a receiving state. In the receiving state, the first storage container support 422 is arranged substantially parallel to the horizontal plane $P_H$, as illustrated in FIG. 10.

The inner carriage 420 may have a picking state. In the picking state, the first storage container support 422 is tilted relative to the horizontal plane $P_H$ with a predetermined tilting angle α, as illustrated in FIG. 13a.

The access station 400 may comprise a ramp 470 for interaction with the follower 424. As illustrated inter alia in FIG. 11 and FIG. 12, the ramp 470 may be at least partly arranged below the transfer zone $Z_T$.

The follower 424 and the ramp 470 may be configured to interact to enter the inner carriage 420 into the picking state in response to a movement of the inner carriage 420 from the receiving position $P_R$ to the picking position $P_P$, which in some cases would include movement through the transfer zone $Z_T$.

Figure 13A:
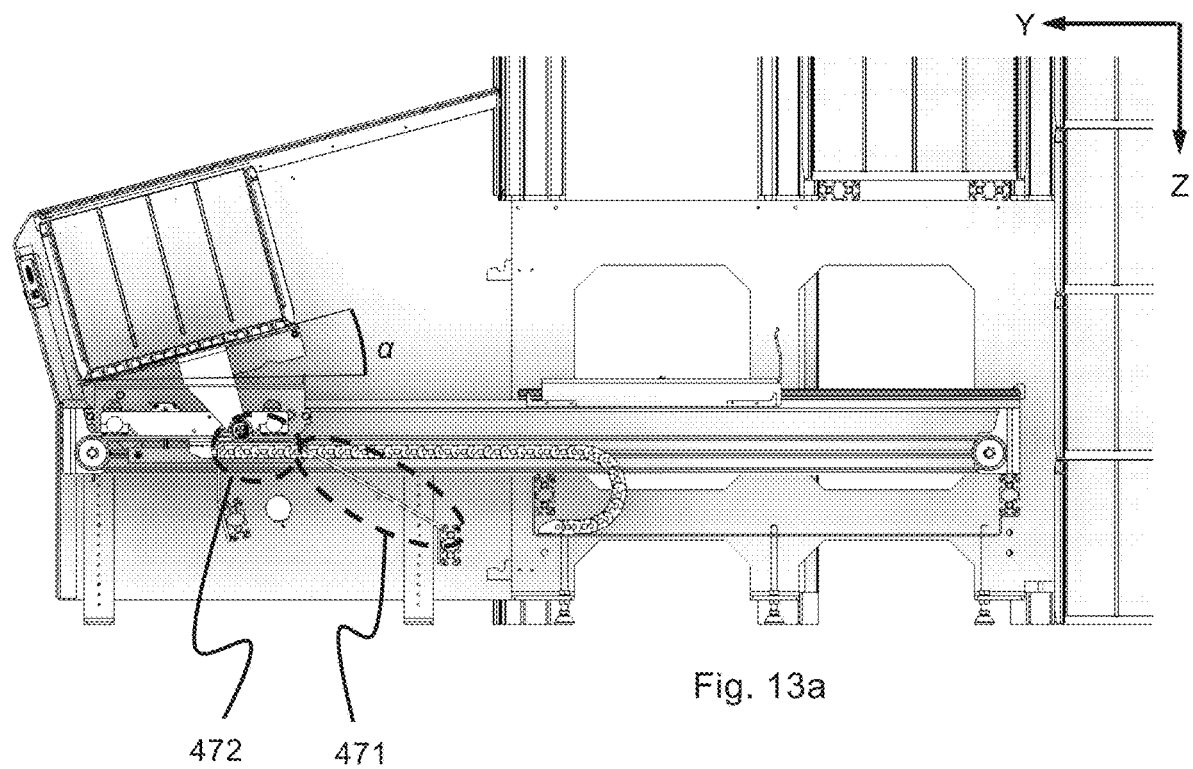
FIG. 13a is a vertical cross-section of the access station with the inner carriage in the picking position and having a predetermined tilting angle.

FIG. 11, FIG. 12 and FIG. 13a illustrate a sequence of how the first storage container support 422 may be tilted relative to the horizontal plane $P_H$ as the inner carriage 420 moves towards the picking position $P_P$. The tilting angle α gradually increases until it reaches the predetermined value. In FIG. 13a, the inner carriage 420 has reached its picking state and the picking position $P_P$. The storage container 106 can thus be presented to a picker.

FIG. 13a illustrates that the ramp 470 may comprise a first portion 471 and a second portion 472. The first portion 471 may be at least partly arranged below the transfer zone $Z_T$, and the second portion 472 may be at least partly arranged below the picking position $P_P$. The first portion 471 may extend into the picking position $P_P$. The first portion 471 may extend into the picking position $P_R$. The second portion 472 may extend into the transfer zone $Z_T$.

The first portion 471 and the second portion 472 are typically inclined relative to the horizontal plane $P_H$. The first portion 471 is typically inclined differently than the second portion 472. The second portion 472 may be oriented substantially in the horizontal plane $P_H$. In FIG. 13a, the follower 424 interacts with the second portion 472 in the picking position $P_P$. In this particular example, the first portion 471 cause the first storage container support 422 to tilt while the second portion 472 maintains the tilting angle α caused by the first portion 471. The ramp 470 may have further portions being differently inclined relative to the horizontal plane $P_H$.

In the example of FIG. 13a, the ramp 470 is a bracket mounted to the guiding frame 410 or another structural member of the access station 400.

Figure 13B:
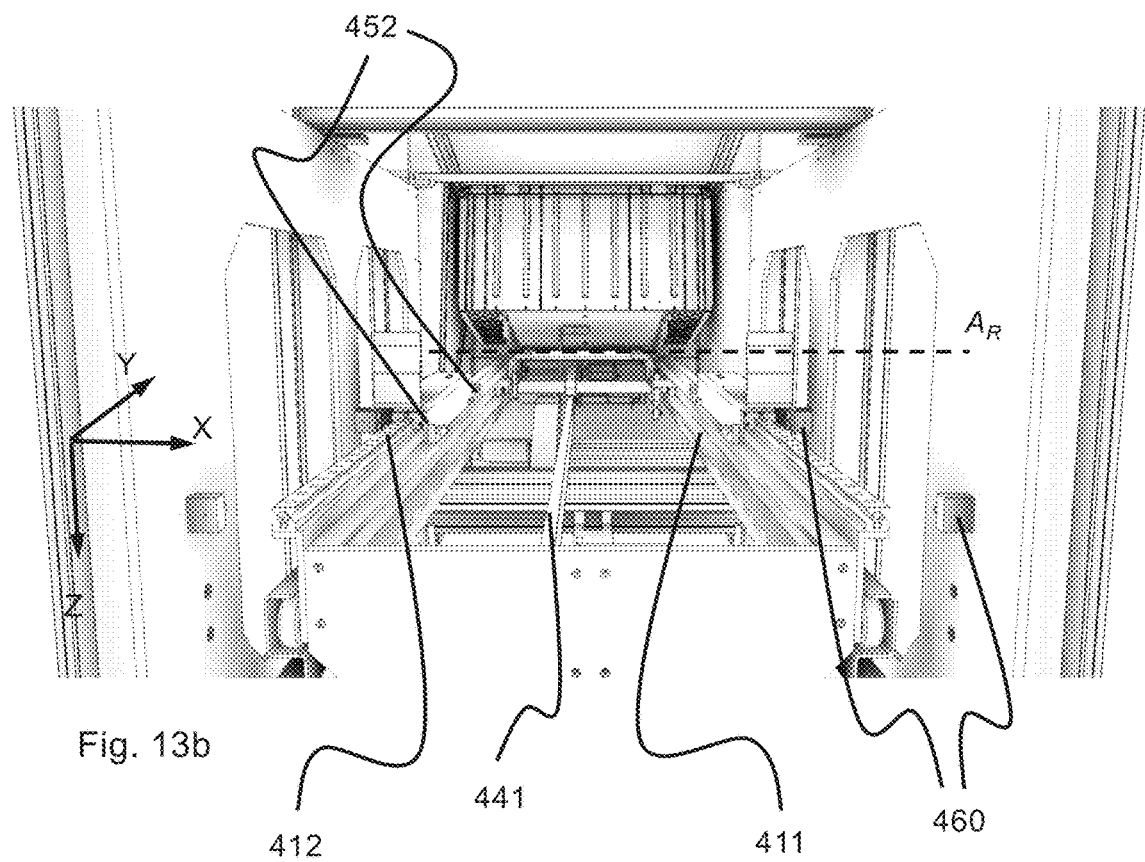

FIG. 13b shows a rear view of the access station of FIG. 13a. In both FIG. 13a and FIG. 13b, it is illustrated how the first storage container support 422 may pivot around an axis of rotation $A_R$. The axis of rotation $A_R$ is in a forward end of the inner carriage 420.

The follower 424 provides a thrust on the first storage container support 422 as it moves along the inclined ramp 470 towards the picking position $P_P$. This thrust cause the first storage container support 422 to tilt relative to the inner carriage base 421. In the example of FIG. 13a and FIG. 13b, the follower 424 is arranged substantially in the centre of the first storage container support 422.

As the inner carriage 420 moves from the picking position $P_P$ towards the receiving position $P_R$, the storage container support 422 will move towards the horizontal position, i.e. the receiving state of the inner carriage 420. This may be caused by gravity. Depending on the position of the follower 424 relative to the axis of rotation $A_R$ and on the weight distribution in the storage container 106, gravity alone may not be enough. In such cases the ramp 470 may be configured as a track restricting the vertical movement of the follower 424 at any given position. The ramp 470 may thus pull the follower down and lift the follower up, as the case may be.

The follower 424 extends from the first storage container support 422 a given length. The length of the follower 424 preferably makes it extends through the inner carriage base 421, at least in the receiving state. The length of the follower 424 may preferably make it extend through the inner carriage base 421 also in the picking state. By extending through the inner carriage base 421, the follower 424 allows the ramp 470 to be arranged below the receiving position $P_R$, the transfer zone $Z_T$, and/or the picking position $P_P$. Thus, the ramp 470 will not obstruct the travel of the inner carriage 420.

In the configuration of FIG. 13a and FIG. 13b, the ramp 470 is vertically aligned with the guiding frame 410. This configuration allows the access station 400 to have a smaller width as compared to a configuration where the ramp 470 is arranged on the side of the guiding frame 410. The access station may thus have a width close to the width $W_f$ or length $L_f$ of the storage containers 106.

A retention lip 423 may be provided to prevent the storage container 106 from sliding off the first container support 422 as the inner carriage 420 enters the picking state. The retention lip 423 is therefore provided on the edge of the first storage container support 422 having the lowest vertical elevation in the picking state.

Figure 14A:
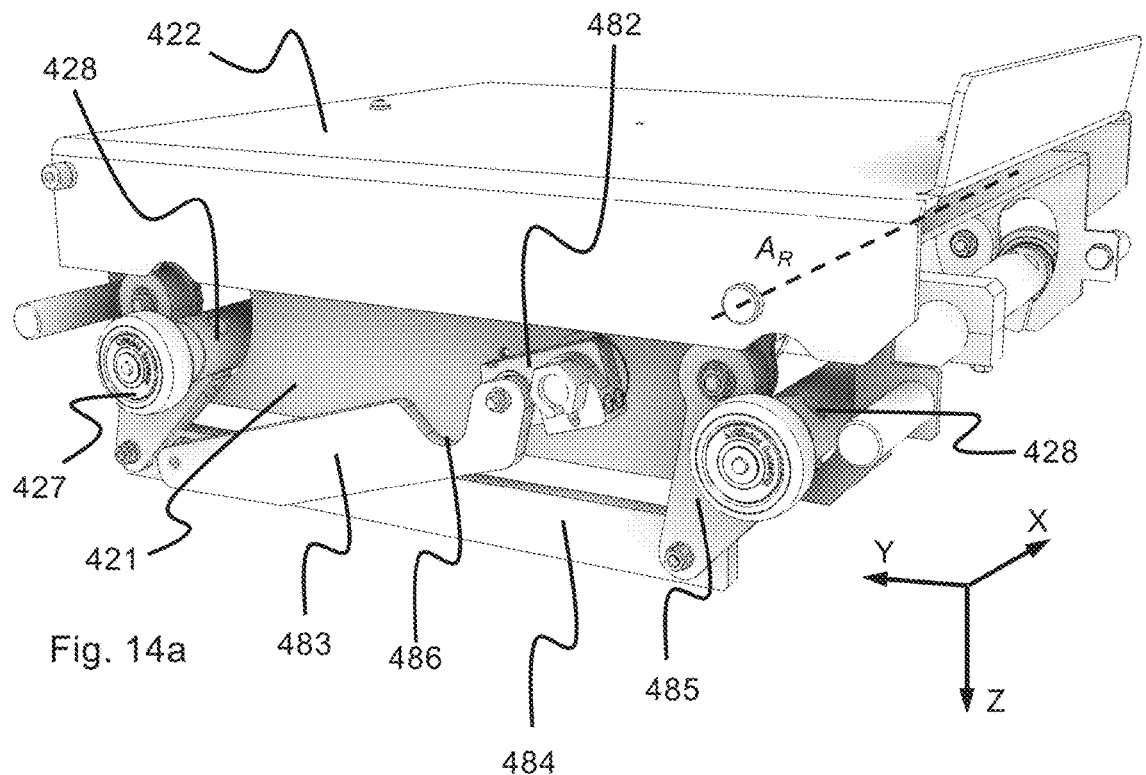
FIG. 14a is perspective view of the inner carriage in an elevated state.
Figure 14B:
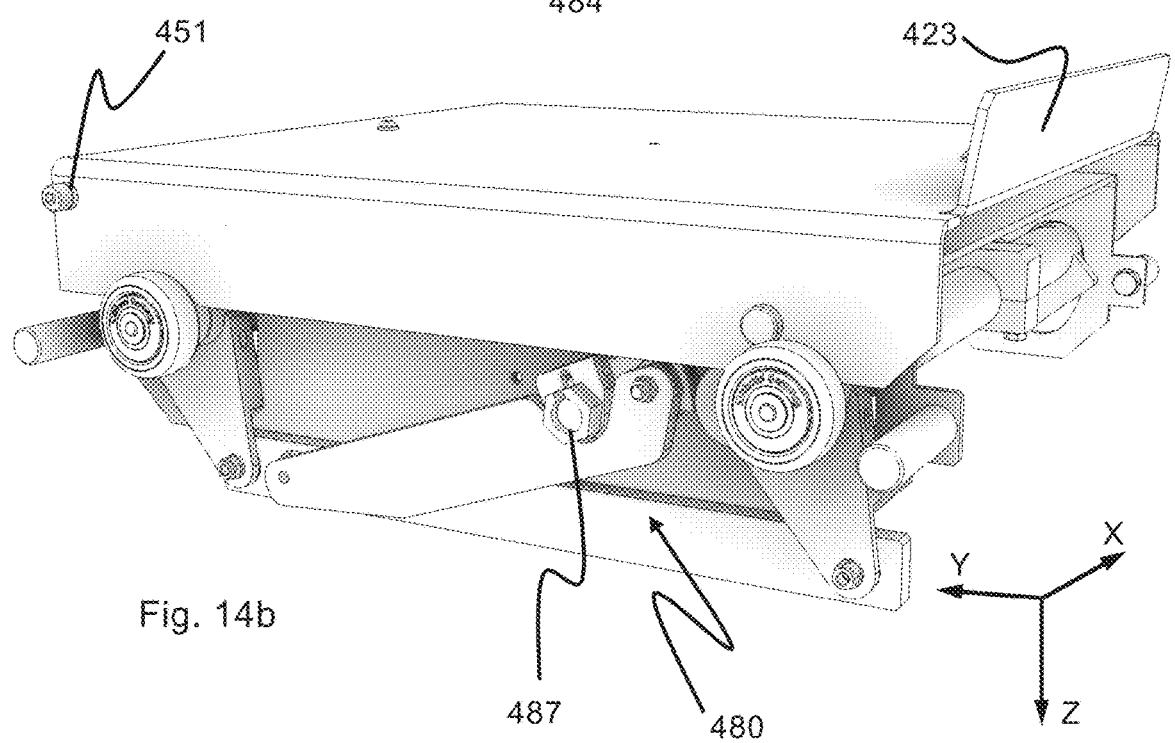
FIG. 14b is perspective view of the inner carriage in a lowered state.
Figure 14C:
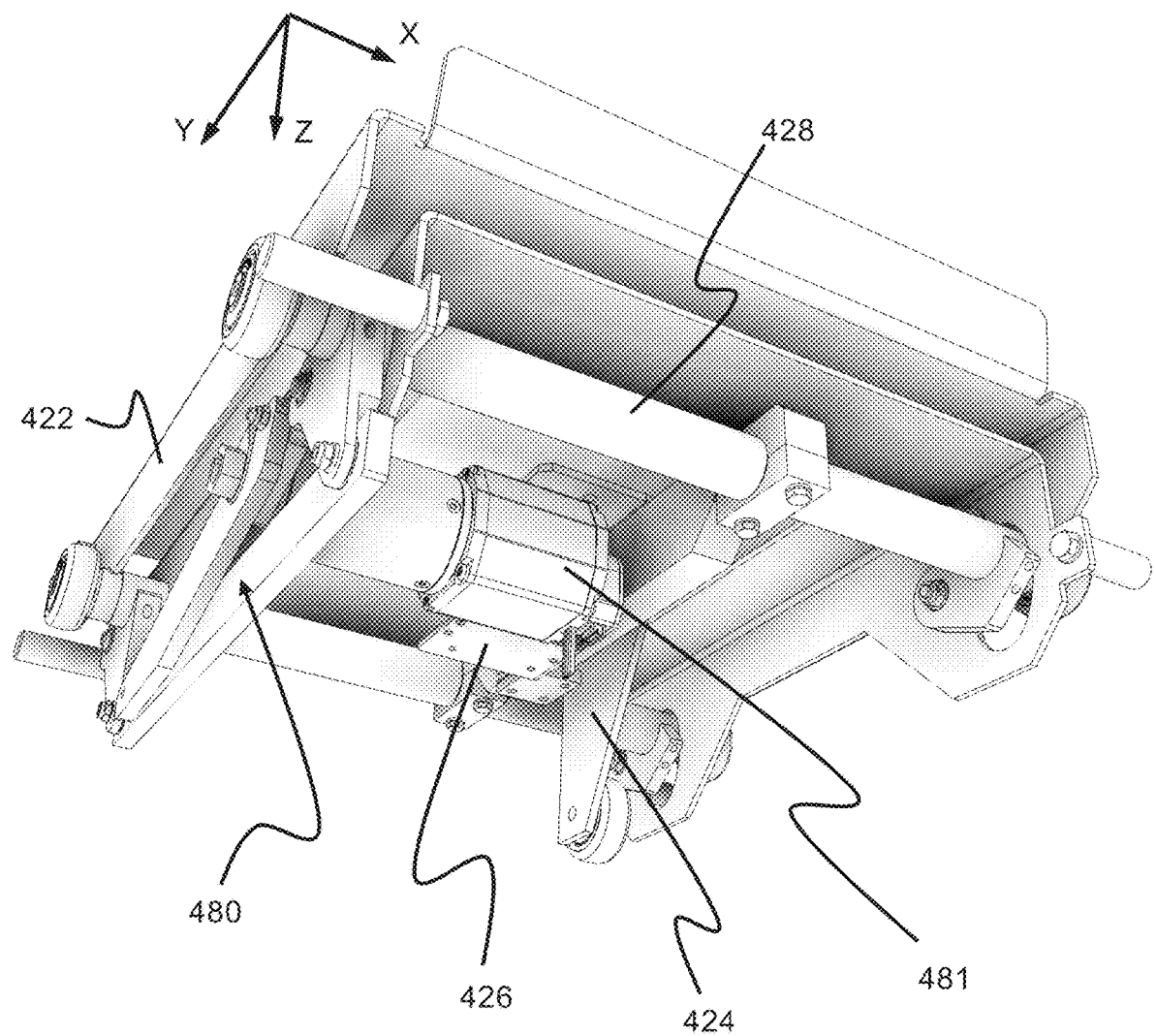
FIG. 14c is an underside perspective view of the inner carriage in a lowered state.

FIG. 14a, FIG. 14b and FIG. 14c illustrates that the inner carriage 420 may have an elevated state and a lowered state. The elevated state is exemplified in FIG. 14a, and the lowered state is exemplified in FIG. 14b and FIG. 14c. In the elevated state, the first storage container support 422 will have a greater vertical distance to the guiding frame 410 than in the lowered state, when the inner carriage 420 is movably arranged on the guiding frame 410. When the inner carriage base 421 is a wheeled base. The distance between the wheels 427 and the first storage container support 422 will then typically be greater in the elevated state than in the lowered state.

In order to shift between the elevated state and the lowered state, the inner carriage 420 may comprise an elevation mechanism 480. The elevation mechanism 480 may comprise a motor 481, a drive crank 482, coupler link 483, a drive coupling link 484 and a displacement link 485. The elevation mechanism 480 may be arranged on the inner carriage base 421.

The motor 481 can providing rotational drive and may preferably be arranged in the inner carriage base 421. The drive crank 482 is coupled to the motor 481 and configured to transmit rotational drive from the motor 481. The coupler link 483 may be pivotally coupled to the drive crank 482. The drive coupling link 484 may be pivotally coupled to the coupler link 483. The coupler link 483 may thus transfer rotational drive from the drive crank 482 to the drive coupling link 484. The displacement link 485 may be provided in sets pivotally coupled to opposite ends of the drive coupling link 484.

The displacement links 485 may be pivotably connected to the inner carriage base 421, such that the drive coupling link 484, the displacement link 485 and the inner carriage base 421 act as a parallel-linkage mechanism. The parallel-linkage mechanism may raise and lower the first storage container support 422.

The coupler link 483 may be formed with a recess 486. In FIG. 14b it is illustrated that the pivot point 487 of the drive crank 482 can be in the recess 486, e.g. in the lowered state of the inner carriage 420.

The drive crank 482 will typically rotate 180 degrees to move the inner carriage 420 from the elevated state to the lowered state.

The inner carriage 420 may comprise a set of axles 428. The axle 428 itself may be configured to interface the guiding frame 410 in a movable manner. Or, if the inner carriage 420 comprises a wheeled base, the axle 428 may be configured for rotational connection of the wheels 427.

Each displacement link 485 may be configured to support the axle 428, or preferably connected to the axle 428, such that the axle 428 can be moved relative to the first container support 422 in response to operation of the parallel-linkage mechanism.

FIG. 15a shows the same cross-section of the access station 400 as FIGS. 10-13a, and FIG. 15b shows a rear view of the access station of FIG. 15a. In FIG. 15a and FIG. 15b, the inner carriage 420 and the outer carriage 430 are both in the buffering area $A_B$.

As illustrated in 15b, the outer carriage 430 may comprise a second storage container support 431 making it suitable for supporting and transporting of storage containers 106. A gap 432 may be provided in the second storage container support 431 in which the inner carriage 420 may be received. The inner carriage 420 can thus be in the buffering area $A_B$ or in the receiving position $P_R$ at the same time as the outer carriage 430.

In FIG. 15a and FIG. 15b the inner carriage 420 is in the elevated state. As illustrated in FIG. 15b, the first storage container support 422 has a higher vertical elevation than the second storage container support 431 when the inner carriage 420 is in the elevated state. The storage container 106 illustrated in FIG. 15a will thus be supported by the first storage container support 422 when the inner carriage 420 and the outer carriage 430 are in the same position/zone/area and the inner carriage 420 is in the elevated state.

Figure 16:
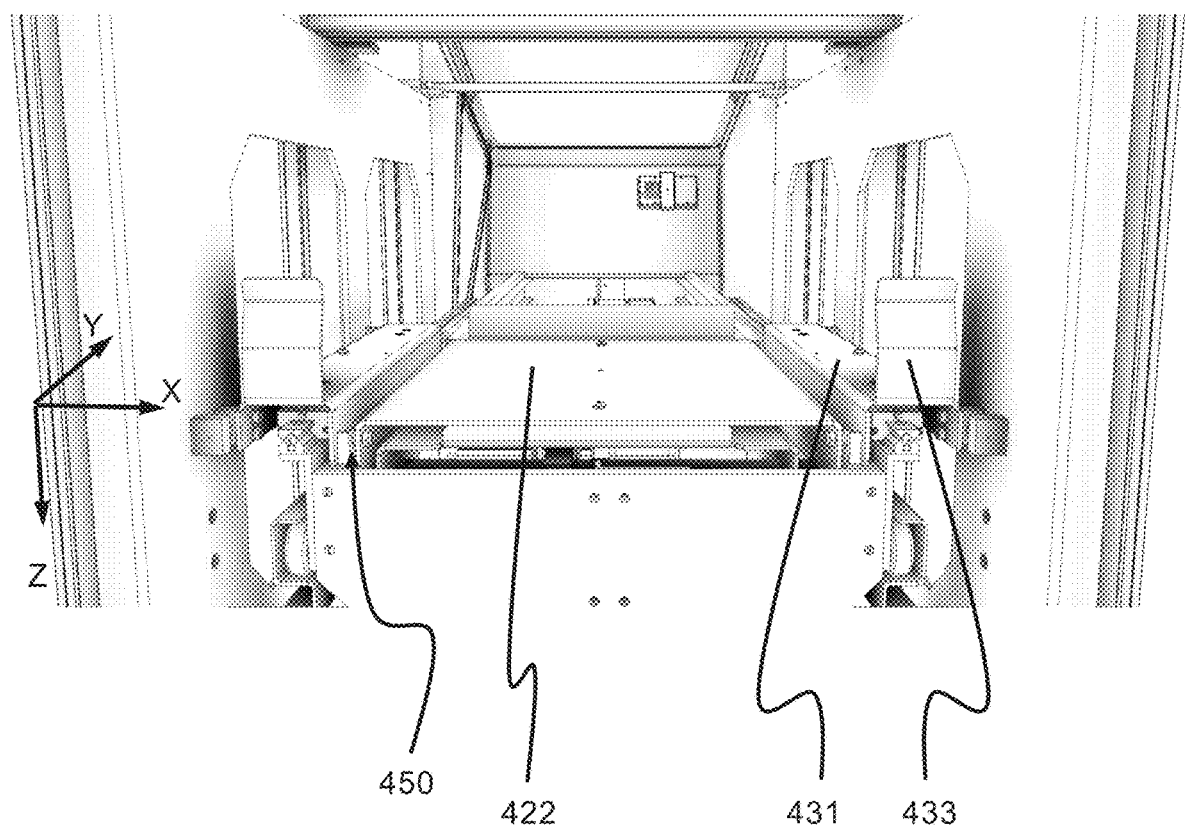
FIG. 16 is a rear view of the access station with both the inner carriage and the outer carriage in the buffer area, the inner carriage is in the lowered state.

FIG. 16 shows the same rear view as FIG. 15b, except that the inner carriage 420 is in the lowered state. The second storage container support 431 then has a higher vertical elevation than the first storage container support 422. A storage container 106 may thus be transferred from the first storage container support 422 to the second storage container support 431 by means of entering the inner carriage 420 into the lowered state while being substantially in the same position as the outer carriage 430. In a similar fashion, a storage container 106 may be transferred from the second storage container support 431 to the first storage container support 422 by means of entering the inner carriage 420 into the elevated state while being substantially in the same position as the outer carriage 430.

The gap 432 in the outer carriage 430 may preferably have a length in the first direction X not exceeding at least one of the length $L_f$ or the width $W_f$ of the storage container 106, such that the storage container 106 can be supported by the second storage container support 431. The storage container 106 may thus extend on the outside of the first storage container support 422 at least in the first direction X.

The outer carriage 430 may be configured for movement along a second guide path 412 of the guiding frame 410. The outer carriage 430 and the inner carriage 420, that is movable along the first guide path 411, may thus move along the guiding frame 410 without interfering with each other.

The outer carriage 430 may be configured to be movable along the guiding frame 410 by means of the inner carriage 420. This can be achieved by means of a vertical plate 433 arranged on the outer carriage 430. The vertical plate 433 does not necessarily have to be orthogonal to the horizontal plane $P_H$. The vertical plate 433 may be configured to interact with the storage container 106 supported by the inner carriage 420. When the storage container 106 supported on the first storage container support 422 is moved into contact with the vertical plate 433, further movement of the inner carriage 420 will push the outer carriage 430 in the same direction.

One example of such movement may be when the outer carriage 430 is in the receiving position $P_R$ and the inner carriage is in the picking position $P_P$ and they are both going to move into the buffering area $A_B$. No storage container 106 is supported by the second storage container support 431. One storage container 106 is supported by the inner carrier 420 in the elevated state. The inner carriage 420 may be moved from the picking position $P_P$ through the receiving position $P_R$ into the buffering area $A_B$ by means of the displacement device 440. As the inner carriage 420 reaches the receiving position $P_R$, the vertical plate 433 of the outer carriage 430 will interact with the storage container 106 supported by the first storage container support 422. As the inner carriage 420 moves further towards the buffering area $A_B$, the outer carriage 430 will be pushed along.

Figure 17A:
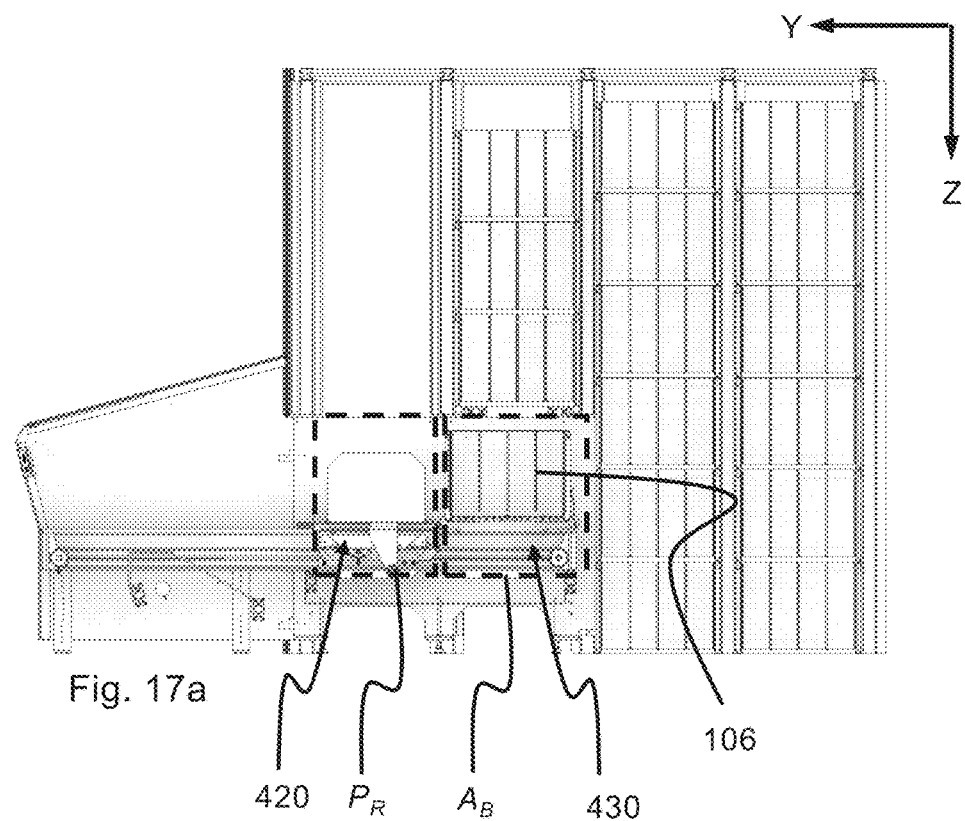
FIG. 17a is a vertical cross-section of the access station with the inner carriage in the lowered state and located in the receiving position and the outer carriage located in the buffer area and carrying a storage container received from the inner carriage, the inner carriage and the outer carriage being connected.

The inner carriage 420 may move the outer carriage 430 along the guiding frame 410 by means of an attachment system 450. The attachment system 450 may comprise a first coupling part 451 arranged on the inner carriage 420 and a second coupling part 452 arranged on the outer carriage 430, also illustrated in FIG. 11. The attachment system 450 may be configured to releasably connect the inner carriage 420 to the outer carriage 430. In the exemplifying FIG. 17a and FIG. 17b, the attachment system 450 is configured to connect the inner carriage 420 to the outer carriage 430 by means of entering the lowered state of the inner carriage 420, and to disconnect the inner carriage 420 from the outer carriage 430 by means of entering the elevated state of the inner carriage 420.

The first coupling part 451 is preferably a peg extending in the first direction X, and the second coupling part 451 may preferably be a hook extending in the first direction X and configured to connect with the peg moving in the second direction Y.

The first coupling part 451 is preferably arranged in a rear end of the inner carriage 420. The second coupling part 452 is preferably arranged in a forward end of the outer carriage 451. The outer carriage 430 may preferably also be provided with a second coupling part 452 in a rear end, i.e. the two second coupling parts 452 being spaced apart. Movement of the inner carriage 420 in the second direction Y may thus cause the outer carriage 430 to follow. However, some movement of the first coupling part 451 may be allowed between the forward second coupling part 452 and the rear second coupling part 452. The inner carriage 420 may thus be positioned differently relative to the outer carriage 430 depending on the direction of movement, i.e. when moving from the buffer area $A_B$ towards the picking position $P_P$ or when moving from the receiving position $P_R$ towards the buffer area $A_B$.

Figure 18:
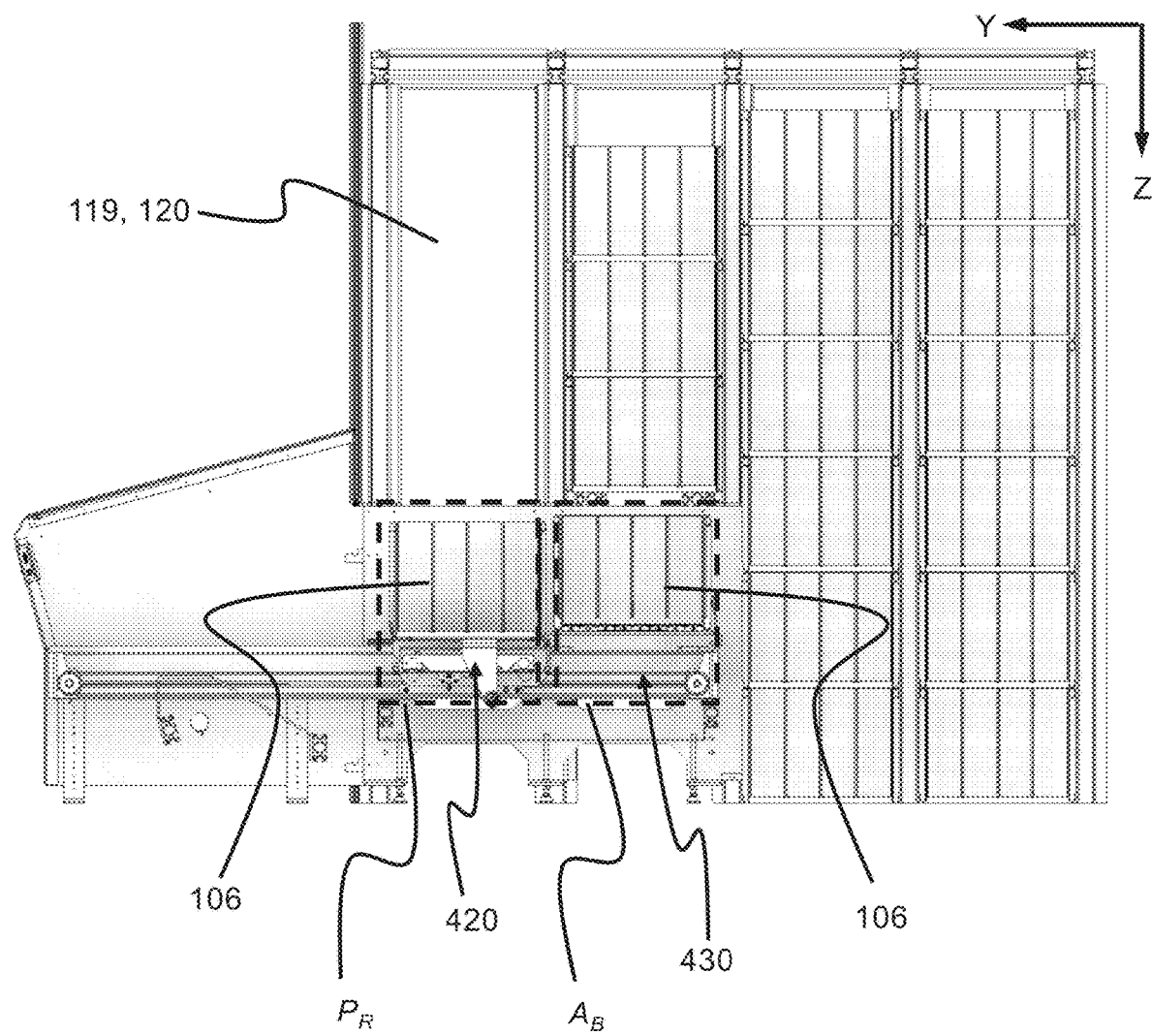
FIG. 18 is a vertical cross-section of the access station with the inner carriage in the lowered state, located in the receiving position and carrying a storage container received through a port column, the outer carriage located in the buffer area and carrying a storage container received from the inner carriage, the inner carriage and the outer carriage being connected.

When moving from the buffer area $A_B$ towards the picking position $P_P$, the first storage container support 422 may preferably enter a position outside the gap 432 such that the outer carriage 430 can be in the buffer area $A_B$ and the inner carriage 420 can be in the receiving position $P_R$ while being connected to each other. In this way, the second storage container support 431 may support one storage container 106 while the first storage container support 422 receives another storage container 106. This is illustrated in FIG. 18.

When moving from the picking position $P_P$ towards the buffer area $A_B$, the first storage container support 422 may preferably be received in the gap 432 such that the outer carriage 430 and the inner carriage 420 can both be in the buffer area $A_B$ while being connected to each other.

By having a port column 119, 120 arranged above the receiving position $P_R$, storage containers 106 can be received and retrieved from the first storage container support 422 or the second storage container support 431 when positioned in the receiving position $P_R$.

Figure 17B:
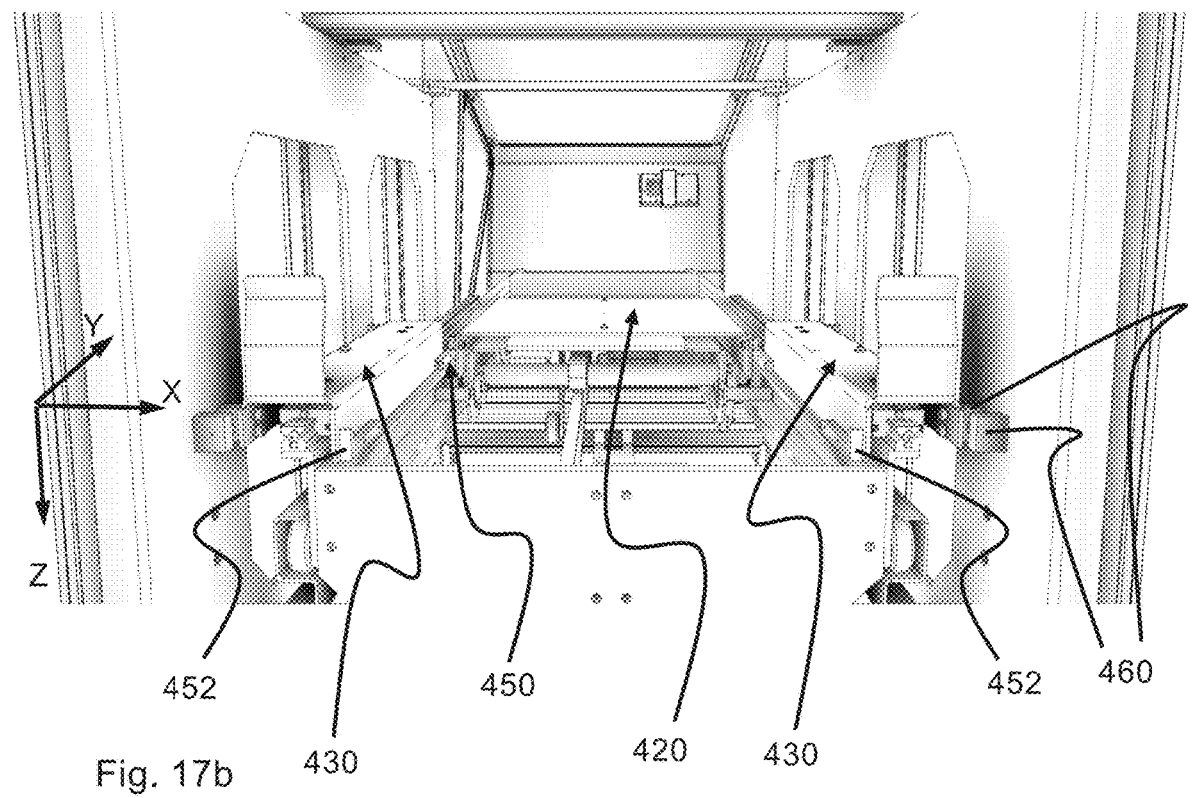
FIG. 17b is a rear view of the access station with the inner carriage in the lowered state and located in the receiving position and the outer carriage located in the buffer area, the inner carriage and the outer carriage being connected.
Figure 19A:
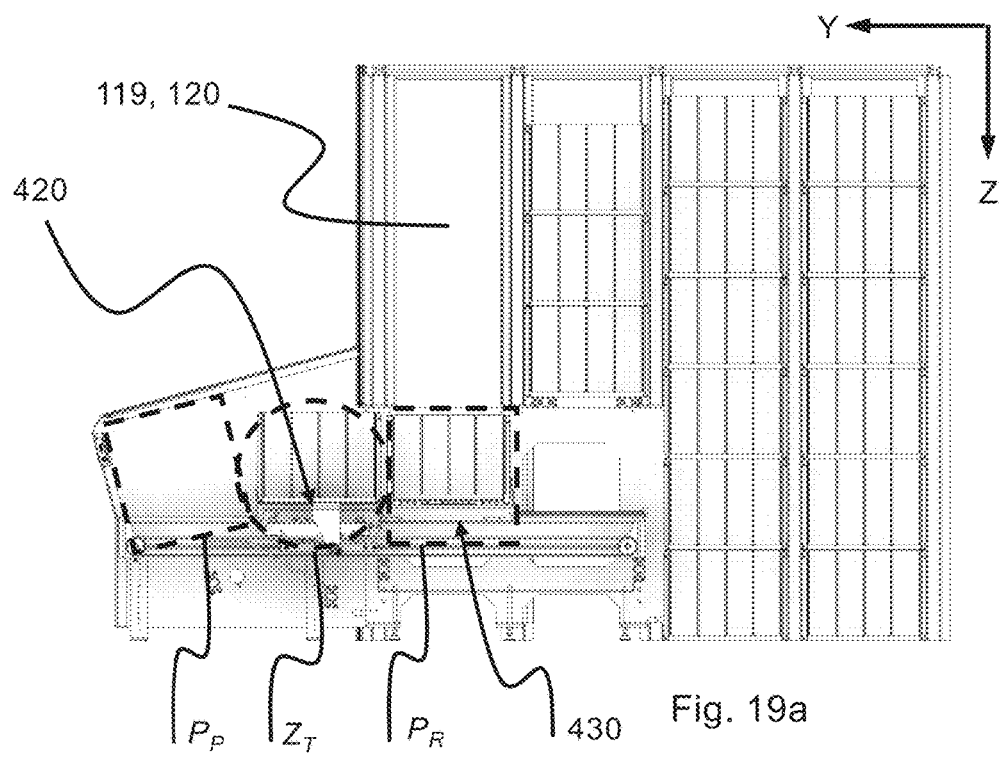
FIG. 19a is a vertical cross-section of the access station with the inner carriage in the lowered state, located in the transfer zone and carrying a storage container, the outer carriage located in the receiving position and carrying a storage container to be retrieved through the port column, the inner carriage and the outer carriage being connected.
Figure 19B:
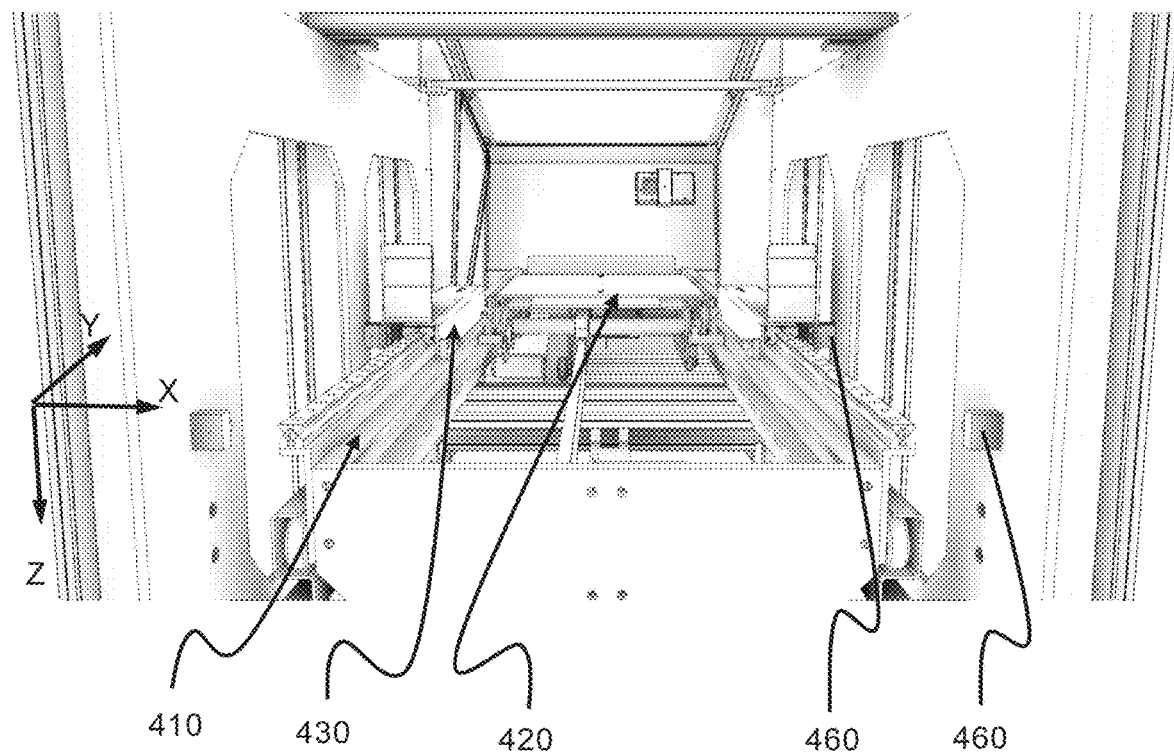
FIG. 19b is a rear view of the access station with the inner carriage in the lowered state and located in the transfer zone, the outer carriage located in the receiving position, the inner carriage and the outer carriage being connected.

A position holding device 460 may be provided in the access station 400. The position holding device 460 may be configured to hold the outer carriage 430 in a predetermined position, e.g. the receiving position $P_R$ or the buffer area $A_B$. FIG. 17b and FIG. 19b illustrate how this may be realized by means of magnets. The position holding device 460 may hold the outer carriage 430 in position until a predetermined force is applied the outer carriage 430, e.g. from the inner carriage 420. The position holding device 460 will prevent drifting of the outer carriage 430 when not moved by the inner carriage 420.

Figure 20:
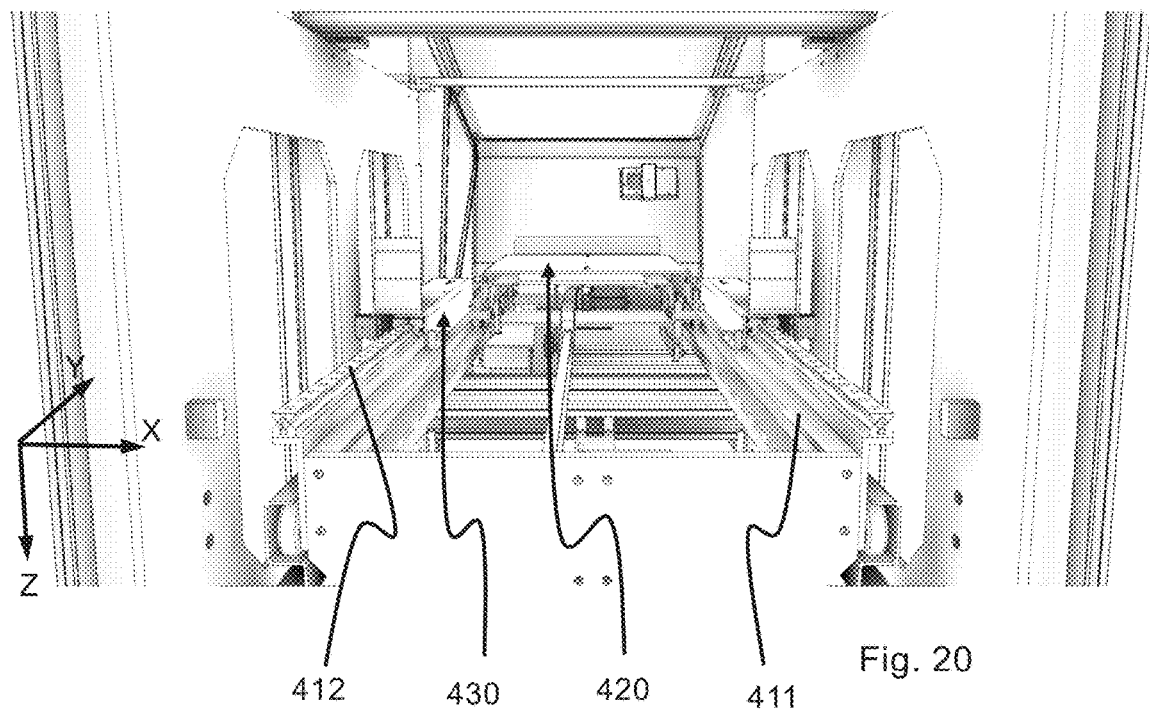
FIG. 20 is a rear view of the access station with the inner carriage in the elevated state and located in the transfer zone, the outer carriage located in the receiving position, the inner carriage and the outer carriage being disconnected.
Figure 21:
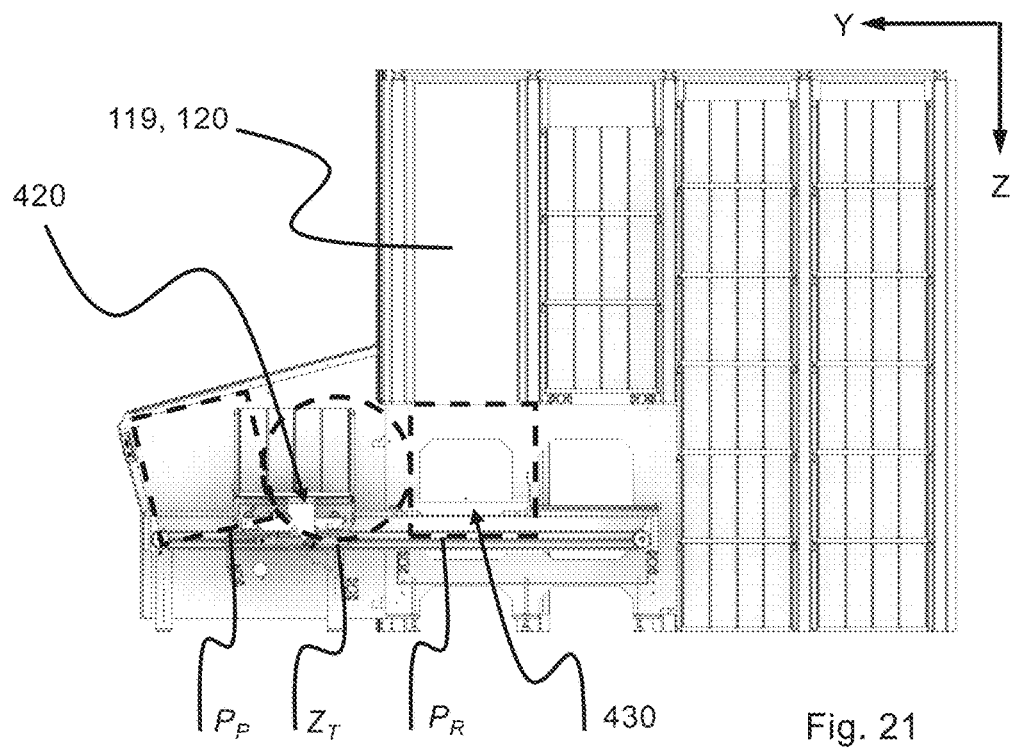
FIG. 21 is a vertical cross-section of the access station with the inner carriage in the elevated state, located in the transfer zone and carrying a storage container to be presented to a picker, the outer carriage located in the receiving position and the storage container has been retrieved through the port column, the inner carriage and the outer carriage being disconnected.

After presentation of a storage container 106 to a picker, the inner carriage 420 may thus move itself and the outer carriage 430 to the buffer area $A_B$ where the presented storage container 106 can be transferred from the inner carriage 420 to the outer carriage 430. The inner carriage 420 may then be releasably connected to the outer carriage 430 by means of the attachment system 450. Alternatively, the inner carriage 420 could have be releasably connected to the outer carriage 430 when both were in the receiving position $P_R$. The inner carriage 420 may then move to the receiving position $P_R$ to receive a new storage container 106 to be presented to the picker, while the outer carriage 430 remains in the buffer area $A_B$. The inner carriage 420 may subsequently move the outer carriage 430 to the receiving position $P_R$ such that the presented storage container 106 can be retrieved, as illustrated in FIG. 19a. The inner carriage 420 may then disconnect from the outer carriage 430 by means of entering the elevated state, as illustrated (without the storage container 106) in FIG. 20, and move towards the picking position $P_P$, as illustrated in FIG. 21. In the picking position $P_P$, the newly received storage container 106 can be presented to the picker. The previously presented storage container 106 may be retrieved before or after disconnection of the inner carriage 420. This procedure may then be repeated.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
80 Product item
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
400 Access station
410 Guiding frame
411 First guide path, of the guiding frame
412 Second guide path, of the guiding frame
415 Grid frame
420 Inner carriage
421 Inner carriage base
422 First storage container support
423 Retention lip
424 Follower
425 Follower wheel
426 Drive belt bracket
427 Wheel, of inner carriage
428 Axle, for wheels
430 Outer carriage
431 Second storage container support
432 Gap, in outer carriage
433 Vertical plate
440 Displacement device
441 Drive belt
442 Electric motor
450 Attachment system
451 First coupling part
452 Second coupling part
460 Position holding device
470 Ramp
471 First portion, of the ramp
472 Second portion, of the ramp
480 Elevation mechanism, for inner carriage
481 Motor, for elevation mechanism
482 Drive crank, for elevation mechanism
483 Coupler link, for elevation mechanism
484 Drive coupling link, for elevation mechanism
485 Displacement link, for elevation mechanism
486 Recess in the coupler link
487 Pivot point of the drive crank
490 Access cabinet, with hatch
500 Control system
$P_H$ Horizontal plane
$P_P$ Picking position
$P_R$ Receiving position
$A_B$ Buffer area
$Z_T$ Transfer zone
$W_f$ Width of the storage container
$L_f$ Length of the storage container
$H_f$ Height of the storage container
$A_f$ Area of the storage container α Tilting angle
$A_R$ Axis of rotation
X First direction
Y Second direction
Z Third direction

The invention claimed is:

1. An access station for presentation of a storage container from automated storage and retrieval system to a picker, the access station having a receiving position for receiving a storage container, forward of the receiving position a picking position for picking products from the storage container, and a transfer zone connecting the receiving position and the picking position,
   wherein the access station comprising:
   a ramp at least partly arranged below the transfer zone;
   a guiding frame arranged in a horizontal plane and extending between the picking position, the transfer zone and the receiving position;
   an inner carriage for transporting the storage container, wherein the inner carriage comprises:
   i. An inner carriage base movable along the guiding frame;
   ii. a first storage container support pivotably connected to the inner carriage base; and
   iii. a follower connected to and extending from the first storage container support for interaction with the ramp;
   wherein the inner carriage has a receiving state in which the first storage container support is arranged substantially parallel to the horizontal plane, and a picking state in which the first storage container support is tilted relative to the horizontal plane with a predetermined tilting angle; and
   a displacement device configured to move the inner carriage between the receiving position and the picking position;
   wherein the follower and the ramp are configured to interact to move the inner carriage into the picking state in response to a movement of the inner carriage from the receiving position to the picking position.

2. The access station according to claim 1, wherein the inner carriage base is a wheeled base.

3. The access station according to claim 1, wherein the displacement device comprises a drive belt operated by an electric motor.

4. The access station according to claim 1, wherein the ramp has a first portion at least partly arranged below the transfer zone, wherein the first portion is inclined relative to the horizontal plane.

5. The access station according to claim 4, wherein the ramp comprises a second portion at least partly arranged below the picking position, wherein the second portion is inclined differently than the first portion relative to the horizontal plane.

6. The access station according to claim 1, wherein a pivotal connection between the inner carriage base and the first container support has an axis of rotation substantially arranged in the horizontal plane, and the follower is arranged at a distance from the axis of rotation.

7. The access station according to claim 1, wherein the follower comprises a distal end provided with a follower wheel.

8. The access station according to claim 1, wherein the follower extends through the inner carriage base at least in the receiving state.

9. The access station according to claim 1, wherein the tilting angle is in the range from 2° to 60° relative to the horizontal plane.

10. The access station according to claim 1, wherein the access station, behind the receiving position, has a buffer area for buffering of a storage container, wherein the access station comprises:
    an outer carriage for transporting the storage container, the outer carriage being movable along the guiding frame by means of the inner carriage, wherein the outer carriage comprises:
    i. a second storage container support; and
    ii. a gap provided in the second storage container support for receiving the first container support of the inner carriage; and
    an attachment system for releasably connecting the inner carriage to the outer carriage;
    wherein the inner carriage base comprises:
    an elevation mechanism for raising and lowering the first storage container support relative to the guiding frame;
    wherein the displacement device is configured to move the inner carriage between the receiving position, the picking position, and the buffer area;
    wherein the inner carriage has an elevated state in which the first storage container support is arranged at a higher elevation than the second storage container support, and a lowered state in which the first storage container support is arranged at a lower elevation than the second storage container support.

11. The access station according to claim 10, wherein the attachment system comprises:
    a first coupling part arranged on the inner carriage; and
    a set of second coupling parts arranged on the outer carriage at a horizontal distance defining a horizontal movement range between the inner carriage and the outer carriage;
    wherein the first coupling part and the set of second coupling parts are engageable when the inner carriage is in the lowered state;
    wherein the first coupling part and the second coupling parts are not engageable when the inner carriage is in the elevated state.

12. The access station according to claim 11, wherein the first coupling part is arranged at a rear end of the inner carriage, and the second coupling parts are arranged at opposite ends of the outer carriage.

13. The access station according to claim 10, wherein the outer carriage comprises a vertically extending portion for hooking the storage container positioned on the first storage container support and moving in the horizontal direction towards the buffer area.

14. The access station according to claim 10, wherein the guiding frame comprises a first guide path and a second guide path parallel to the first guide path;
    wherein the inner carriage is movable along the first guide path and the outer carriage is movable along the second guide path.

15. The access station according to claim 10, wherein the access station further comprises:
    a position holding device for holding the outer carriage in a predetermined position.

16. The access station according to claim 10, wherein the elevation mechanism comprises:
    a motor arranged in the inner carriage base for providing rotational drive;
    a drive crank coupled to the motor to transmit rotational drive from the motor;

a coupler link pivotally coupled to the drive crank;
a drive coupling link pivotally coupled to the coupler link, the coupler link coupling rotational drive from the drive crank to the drive coupling link; and
a set of displacement links pivotally coupled to opposite ends of the drive coupling link;
wherein the displacement links are pivotably connected to the inner carriage base, such that the drive coupling link, displacement links and inner carriage base act as a parallel-linkage mechanism that raises and lowers the first storage container support.

17. The access station according to claim 1, wherein the displacement device is configured to move the inner carriage in a reciprocating manner.

18. An inner carriage for an access station according to claim 1,
wherein the inner carriage comprises:
an inner carriage base configured for movement along a guiding frame;
a first storage container support pivotably connected to the inner carriage base; and
a follower connected to and protruding from the first storage container support configured for at least indirectly interaction with a ramp;
wherein the inner carriage has a receiving state in which the first storage container support is arranged substantially parallel to a horizontal plane, and a picking state in which the first storage container support is tilted relative to the horizontal plane with a predetermined tilting angle; and
wherein gravity biases the inner carriage towards the receiving state, and the interaction between the follower and the ramp urges the first storage container support of the inner carriage towards the picking state.

19. The inner carriage according to claim 18,
wherein the inner carriage base further comprises:
an elevation mechanism for raising and lowering the first storage container support.

20. An automated storage and retrieval system, wherein the automated storage and retrieval system comprises:
an access station for presentation of a storage container from automated storage and retrieval system to a picker, the access station having a receiving position for receiving a storage container, forward of the receiving position a picking position for picking products from the storage container, and a transfer zone connecting the receiving position and the picking position,
wherein the access station comprising:
a ramp at least partly arranged below the transfer zone;
a guiding frame arranged in a horizontal plane and extending between the picking position, the transfer zone and the receiving position;
an inner carriage for transporting the storage container, wherein the inner carriage comprises:
i. an inner carriage base movable along the guiding frame;
ii. a first storage container support pivotably connected to the inner carriage base; and
iii. a follower connected to and extending from the first storage container support for interaction with the ramp;
wherein the inner carriage has a receiving state in which the first storage container support is arranged substantially parallel to the horizontal plane, and a picking state in which the first storage container support is tilted relative to the horizontal plane with a predetermined tilting angle; and a displacement device configured to move the inner carriage between the receiving position and the picking position;
wherein the follower and the ramp are configured to interact to move the inner carriage into the picking state in response to a movement of the inner carriage from the receiving position to the picking position;
a rail system comprising a first set of parallel rails arranged in a horizontal plane and extending in a first direction and a second set of parallel rails arranged in the horizontal plane and extending in a second direction which is orthogonal to the first direction, which first and second sets of rails form a grid pattern in the horizontal plane comprising a plurality of adjacent grid cells, each comprising a grid opening defined by a pair of neighbouring rails of the first set of rails and a pair of neighbouring rails of the second set of rails;
a plurality of stacks of storage containers arranged in storage columns located beneath a storage section of the rail system, wherein each storage column is located vertically below a grid opening;
at least one port column located beneath a delivery section of the rail system and vertically aligned with the receiving position of the access station, the at least one port column being void of storage containers; and
a container handling vehicle comprising a lifting mechanism for lifting storage containers stacked in the stacks above the storage section and drive means configured to drive the vehicle along the rail system in at least one of the first direction and the second direction.

21. A method for transferring a storage container using an automated storage and retrieval system according to claim 20,
wherein the method comprises:
placing a first storage container on the first storage container support;
if the inner carriage is in a lowered state, raising the first storage container support to move the inner carriage into an elevated state;
moving the inner carriage along the guiding frame until the first storage container support is substantially received by a gap in the second storage container support; and
lowering the first storage container support to move the inner carriage into the lowered state, thereby placing the storage container on the second storage container support.

22. The method according to claim 21,
wherein the method further comprises:
moving the inner carriage to the receiving position;
placing a second storage container on the first storage container support;
attaching an outer carriage to the inner carriage using an attachment system in case the outer carriage is not already attached to the inner carriage; and
moving the inner carriage and the outer carriage to locate the outer carriage in the receiving position.

23. The method according to claim 22,
wherein the method further comprises:
raising the first storage container support to move the inner carriage into the elevated state, thereby disconnecting the attachment system and separating the inner carriage from the outer carriage; and
moving the inner carriage to the picking position.

24. The method according to claim 22,
wherein the method further comprises:
retrieving the first storage container from the second storage container support through the port column.

25. A method for presenting a storage container to a picker using an access station for presentation of a storage container from automated storage and retrieval system to a picker, the access station having a receiving position for receiving a storage container, forward of the receiving position a picking position for picking products from the storage container, and a transfer zone connecting the receiving position and the picking position,
wherein the access station comprising:
a ramp at least partly arranged below the transfer zone;
a guiding frame arranged in a horizontal plane and extending between the picking position, the transfer zone and the receiving position;
an inner carriage for transporting the storage container, wherein the inner carriage comprises:
i. an inner carriage base movable along the guiding frame;
ii. a first storage container support pivotably connected to the inner carriage base; and
iii. a follower connected to and extending from the first storage container support for interaction with the ramp;
wherein the inner carriage has a receiving state in which the first storage container support is arranged substantially parallel to the horizontal plane, and a picking state in which the first storage container support is tilted relative to the horizontal plane with a predetermined tilting angle; and
a displacement device configured to move the inner carriage between the receiving position and the picking position;
wherein the follower and the ramp are configured to interact to move the inner carriage into the picking state in response to a movement of the inner carriage from the receiving position to the picking position,
wherein the method comprises:
moving the first storage container support of the inner carriage into the receiving state in the receiving position;
placing a target storage container on the inner carriage; and
moving the inner carriage along the guiding frame by means of the displacement device to enter the inner carriage into the picking state in the picking position.

* * * * *